(12) United States Patent
Ogawa et al.

(10) Patent No.: US 9,315,691 B2
(45) Date of Patent: *Apr. 19, 2016

(54) ADHESIVE COMPOSITION

(75) Inventors: Hiroshi Ogawa, Kanagawa (JP); Tatsuhiro Suwa, Kanagawa (JP)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 228 days.

This patent is subject to a terminal disclaimer.

(21) Appl. No.: 13/282,799

(22) Filed: Oct. 27, 2011

(65) Prior Publication Data

US 2012/0108734 A1    May 3, 2012

(30) Foreign Application Priority Data

Oct. 29, 2010  (JP) ................................. 2010-244410
Jun. 3, 2011   (KR) ........................ 10-2011-0054208

(51) Int. Cl.
| | | |
|---|---|---|
| C08F 8/30 | (2006.01) | |
| C09J 7/02 | (2006.01) | |
| C08K 5/14 | (2006.01) | |
| C08K 5/29 | (2006.01) | |
| C08K 5/00 | (2006.01) | |
| C08K 5/544 | (2006.01) | |

(52) U.S. Cl.
CPC ............. C09J 7/0217 (2013.01); *C08K 5/0025* (2013.01); *C08K 5/14* (2013.01); *C08K 5/29* (2013.01); *C08K 5/5442* (2013.01); *C09J 2205/102* (2013.01)

(58) Field of Classification Search
USPC .......... 428/327, 220, 355; 252/500, 511, 513, 252/514; 525/329.9; 524/555, 558
See application file for complete search history.

(56) References Cited

U.S. PATENT DOCUMENTS

| | | | |
|---|---|---|---|
| 5,998,539 A * | 12/1999 | Morishima et al. | 524/591 |
| 7,674,859 B2 | 3/2010 | Saiki et al. | |
| 2007/0148444 A1 | 6/2007 | Kamiya et al. | |
| 2009/0099298 A1* | 4/2009 | Yukawa | 524/506 |
| 2009/0270557 A1 | 10/2009 | Tomita et al. | |
| 2009/0291227 A1* | 11/2009 | Niwa et al. | 427/516 |
| 2010/0159234 A1* | 6/2010 | Bae et al. | 428/327 |
| 2010/0330354 A1* | 12/2010 | Tsukagoshi et al. | 428/220 |
| 2012/0315476 A1 | 12/2012 | Ogawa et al. | |

FOREIGN PATENT DOCUMENTS

| | | |
|---|---|---|
| JP | 2005-307034 A | 11/2005 |
| KR | 10 2007-0066929 A | 6/2007 |
| TW | 200911943 A | 3/2009 |

OTHER PUBLICATIONS

Taiwanese Office Action dated Sep. 13, 2013.

* cited by examiner

*Primary Examiner* — Monique Peets
(74) *Attorney, Agent, or Firm* — Lee & Morse, P.C.

(57) ABSTRACT

An adhesive composition, an optical member, a surface protective film, and an adhesive sheet, the adhesive composition including 100 parts by weight of a (meth)acrylic copolymer having a weight average molecular weight of about 100,000 to about 2,000,000 g/mol; about 0.01 to about 5 parts by weight of a peroxide crosslinking agent; and about 0.001 to about 5 parts by weight of a carbodiimide.

19 Claims, 9 Drawing Sheets

FIG. 1: Table 2

| Composition of polymer (A) | | Preparation Example | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Sample | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 | A-19 |
| Monomer (parts by weight) | BA | 99 | 89.9 | 99.2 | 98.2 | 98 | 95.8 | 87 | 88 | 83.7 | 93.3 | 80 | 88.7 | 94.9 | 85 | 91 | 90 | 80 | 73 | 95 |
| | MA | - | 10 | - | - | - | 3 | 4 | 7 | 15 | 5 | 18.4 | 10 | - | - | - | 9.2 | 18.4 | 25.8 | 3 |
| | HEA | 1 | - | - | - | - | - | - | - | 1 | - | - | - | 0.1 | - | - | - | 1.5 | - | - |
| | 4HBA | - | 0.1 | - | 1.8 | - | 0.2 | - | - | - | - | 0.1 | - | - | - | - | - | - | 0.2 | - |
| | HEAA | - | - | 0.8 | - | - | - | - | - | - | - | - | - | - | - | - | 0.8 | - | - | - |
| | AA | - | - | - | - | 2 | 1 | 9 | 5 | 0.3 | 0.7 | 1.5 | 0.3 | 5 | 15 | 9 | - | 0.1 | 1 | 2 |
| Total (parts by weight) | | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 4500 | 5000 | 4500 | 4000 | 4500 | 4500 | 3500 | 3500 | 3500 | 4000 | 5000 | 3500 | 6000 | 5000 | 6000 | 3500 | 6000 | 4500 | 5000 |
| Solid content (%) | | 20 | 20 | 20 | 20 | 20 | 20 | 20 | 20 | 20 | 20 | 20 | 20 | 20 | 20 | 20 | 20 | 20 | 20 | 20 |
| Weight average molecular weight of polymer (A) in millions g/mol | | 1.6 | 1.6 | 1.6 | 1.4 | 1.6 | 1.4 | 1.2 | 1.2 | 1.2 | 1.4 | 1.5 | 1.3 | 1.7 | 1.5 | 1.7 | 1.2 | 1.6 | 1.4 | 1.5 |

FIG. 2: Table 4

| Composition (parts by weight) | | Example | | | | | | | | | |
|---|---|---|---|---|---|---|---|---|---|---|---|
| | | 1 | 2 | 3 | 4 | 5 | 6 | 7 | 8 | 9 | 10 |
| Polymer (A) | | A-1 | A-2 | A-3 | A-4 | A-5 | A-6 | A-7 | A-8 | A-9 | A-10 |
| | | 100 | 100 | 100 | 100 | 100 | 100 | 100 | 100 | 100 | 100 |
| Peroxide crosslinking agent (B) | B-1 | 0.2 | - | 0.4 | 0.6 | - | - | 0.3 | - | 0.5 | - |
| | B-2 | - | 0.3 | - | - | 0.5 | 0.7 | - | 0.8 | - | 0.4 |
| Carbodiimide crosslinking agent (C) | C-1 | 1 | 0.05 | - | 4 | - | - | - | 1 | 3 | - |
| | C-2 | - | - | - | - | 0.1 | - | 5 | - | - | - |
| | C-3 | - | - | 0.1 | - | - | 0.2 | - | - | - | 0.3 |
| Isocyanate crosslinking agent (D) | D-1 | 0.1 | 1 | 0.2 | - | 0.5 | 0.15 | - | 0.5 | - | 1 |
| Imidazole compound (E) | E-1 | 0.01 | - | - | - | - | - | 0.1 | - | - | - |
| | E-2 | - | 0.02 | - | - | - | - | - | - | - | - |
| | E-3 | - | - | 0.03 | - | 0.05 | - | - | 0.05 | - | 0.07 |
| | E-4 | - | - | - | - | - | - | - | - | - | - |
| Silane coupling agent (F) | F-1 | 0.1 | - | 0.2 | - | 0.3 | 0.1 | 0.1 | 0.1 | 0.3 | 0.1 |
| | F-2 | - | 0.1 | - | 0.2 | - | - | - | - | - | - |
| Additional crosslinking agent (G) | G-1 | - | - | - | - | - | - | - | - | - | - |
| Concentration of adhesive composition (wt%) | | 17 | 17 | 17 | 17 | 17 | 17 | 17 | 17 | 17 | 17 |
| Viscosity of adhesive composition (mPa·s) | Immediately after preparation | 4,000 | 4,500 | 4,000 | 3,500 | 4,000 | 4,000 | 3,000 | 3,000 | 3,000 | 3,500 |
| | After 12 hours | 4,000 | 5,000 | 4,100 | 3,500 | 4,200 | 4,000 | 3,100 | 3,200 | 3,000 | 3,900 |
| Gel fraction of adhesive composition (%) | Immediately after preparation | 76 | 82 | 83 | 78 | 76 | 79 | 87 | 88 | 78 | 80 |
| | After 7 days | 77 | 80 | 85 | 83 | 78 | 84 | 88 | 88 | 82 | 81 |
| Properties | Metal corrosion control and prevention properties | ○ | ○ | ○ | ○ | ○ | ○ | ○ | ○ | ○ | ○ |
| | Light leakage resistance | ◎ | ◎ | ◎ | ○ | ◎ | ◎ | ○ | ◎ | ○ | ◎ |
| | Durability | ○ | ○ | ○ | ○ | ○ | ○ | ○ | ○ | ○ | ○ |
| | Adhesive strength (N/25 mm) | 3 | 5 | 3 | 6 | 3 | 4 | 3 | 3 | 4 | 3 |
| | Adhesion to substrate | ○ | ○ | ○ | ○ | ○ | ○ | ○ | ○ | ○ | ○ |
| | Adherend contamination resistance | ○ | ○ | ○ | ○ | ○ | ○ | ○ | ○ | ○ | ○ |
| | Low-temperature stability | ○ | ○ | ○ | ○ | ○ | ○ | ○ | ○ | ○ | ○ |
| | Reworkability | ○ | ○ | ○ | ○ | ○ | ○ | ○ | ○ | ○ | ○ |

FIG. 3: Table 5

| Composition (parts by weight) | | | Comparative Example | | | | | | | | |
|---|---|---|---|---|---|---|---|---|---|---|---|
| | | | 1 | 2 | 3 | 4 | 5 | 6 | 7 | 8 | 9 |
| Polymer (A) | | | A-11 | A-12 | A-13 | A-14 | A-15 | A-16 | A-17 | A-18 | A-19 |
| | | | 100 | 100 | 100 | 100 | 100 | 100 | 100 | 100 | 100 |
| Peroxide crosslinking agent (B) | | B-1 | - | - | 0.1 | 0.4 | 0.4 | - | - | 0.05 | - |
| | | B-2 | - | - | - | - | - | - | 0.5 | - | 2 |
| Carbodiimide crosslinking agent (C) | | C-1 | - | - | - | - | - | 0.5 | 6.0 | - | - |
| | | C-2 | 1 | - | - | - | - | - | - | 1 | - |
| | | C-3 | - | - | - | - | - | 0.01 | - | - | 2 |
| Isocyanate crosslinking agent (D) | | D-1 | - | 0.5 | 0.5 | - | 0.5 | 0.4 | - | 0.3 | 0.1 |
| Imidazole compound (E) | | E-1 | - | - | 0.08 | - | - | - | 0.03 | - | - |
| | | E-2 | - | - | - | - | - | - | - | 0.1 | - |
| | | E-3 | - | - | - | 0.1 | - | - | - | - | - |
| | | E-4 | - | - | - | - | 0.1 | - | - | - | - |
| Silane coupling agent (F) | | F-1 | 0.1 | 0.1 | - | - | - | 0.1 | 0.1 | 0.1 | - |
| | | F-2 | - | - | - | - | - | - | - | - | 0.2 |
| | | F-3 | - | - | - | - | - | - | - | - | - |
| | | F-4 | - | - | - | 0.5 | - | - | - | - | - |
| Additional crosslinking agent (G) | | G-1 | - | - | - | - | - | - | - | - | - |
| Concentration of adhesive composition (wt%) | | | 17 | 17 | 17 | 17 | 17 | 17 | 17 | 17 | 17 |
| Viscosity of adhesive composition (mPa·s) | Immediately after preparation | | 4,500 | 3,000 | 5,500 | 4,500 | 5,500 | 3,000 | 5,500 | 4,000 | 4,500 |
| | After 12 hours | | 4,600 | 3,800 | 5,700 | 4,400 | 5,800 | 3,000 | 5,500 | 4,400 | 4,600 |
| Gel fraction of adhesive composition (%) | Immediately after preparation | | 0 | 0 | 0 | 4 | 3 | 5 | 73 | 0 | 89 |
| | After 7 days | | 76 | 79 | 78 | 92 | 80 | 77 | 74 | 78 | 90 |
| Properties | Metal corrosion control and prevention properties | | O | O | O | O | O | O | O | O | O |
| | Light leakage resistance | | X | X | X | X | X | X | X | X | X |
| | Durability | | X | X | X | X | X | X | X | X | X |
| | Adhesive strength (N/25 mm) | | 36 | 30 | 28 | 23 | 32 | 26 | 5 | 34 | 6 |
| | Adhesion to substrate | | X | X | X | X | X | X | X | X | X |
| | Adherend contamination resistance | | X | X | X | X | X | X | X | X | X |
| | Low-temperature stability | | X | X | X | X | X | X | X | X | X |
| | Reworkability | | X | X | X | X | X | X | X | X | X |

FIG. 4: Table 6

| Composition of polymer (A) | | Preparation Example | | | | | | | | | | | | | | | | | | |
|---|---|---|---|---|---|---|---|---|---|---|---|---|---|---|---|---|---|---|---|---|
| | | 20 | 21 | 22 | 23 | 24 | 25 | 26 | 27 | 28 | 29 | 30 | 31 | 32 | 33 | 34 | 35 | 36 | 37 | 38 |
| Sample | | A-20 | A-21 | A-22 | A-23 | A-24 | A-25 | A-26 | A-27 | A-28 | A-29 | A-30 | A-31 | A-32 | A-33 | A-34 | A-35 | A-36 | A-37 | A-38 |
| Monomer (parts by weight) | BA | 40 | - | 10.8 | 10 | 5 | 2 | 20 | - | 8 | 5 | 30 | 10 | 40 | - | - | 2 | 60 | 15 | 16 |
| | 2EHA | 59 | 98 | 80 | 89 | 92 | 91.9 | 78 | 98 | 90 | 92.5 | 67 | 89 | 58.5 | 99.0 | 93.8 | 97 | 35.8 | 82 | 80 |
| | HEA | 1 | - | - | - | 3 | - | - | - | 1 | - | - | - | 1 | 1 | 6 | - | 4 | - | - |
| | 4HBA | - | - | - | 1 | - | 6 | - | 2 | - | 1 | - | 1 | - | - | - | - | - | 3 | - |
| | HEAA | - | 2 | 9 | - | - | - | 2 | - | 1 | 1 | 3 | - | - | - | - | 1 | - | - | 4 |
| | AM | - | - | - | - | - | - | - | - | - | - | - | - | 0.5 | - | 0.2 | - | - | - | - |
| | AA | - | - | 0.2 | - | - | 0.1 | - | - | - | 0.5 | - | - | - | - | - | - | 0.2 | - | - |
| Total (parts by weight) | | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 3500 | 1500 | 1000 | 1500 | 2000 | 1000 | 2500 | 1500 | 1500 | 1500 | 4000 | 3500 | 4000 | 2000 | 3000 | 2800 | 4000 | 3500 | 3000 |
| Solid content (%) | | 35 | 35 | 35 | 35 | 35 | 35 | 35 | 35 | 35 | 35 | 35 | 35 | 35 | 35 | 35 | 35 | 35 | 35 | 35 |
| Weight average molecular weight of polymer (A) in millions g/mol | | 0.8 | 0.3 | 0.5 | 0.4 | 0.4 | 0.4 | 0.5 | 0.3 | 0.3 | 0.4 | 0.7 | 0.6 | 0.8 | 0.3 | 0.4 | 0.4 | 0.9 | 0.5 | 0.5 |

FIG. 5: Table 8

| Composition (parts by weight) | | 11 | 12 | 13 | 14 | Example 15 | 16 | 17 | 18 | 19 | 20 |
|---|---|---|---|---|---|---|---|---|---|---|---|
| Polymer (A) | | A-20 | A-21 | A-22 | A-23 | A-24 | A-25 | A-26 | A-27 | A-28 | A-29 |
| | | 100 | 100 | 100 | 100 | 100 | 100 | 100 | 100 | 100 | 100 |
| Peroxide crosslinking agent (B) | B-1 | 0.2 | - | 0.4 | 0.6 | - | - | 0.3 | - | 0.5 | - |
| | B-2 | - | 0.3 | - | - | 0.5 | 0.7 | - | 0.8 | - | 0.4 |
| Carbodiimide crosslinking agent (C) | C-1 | 0.5 | 0.7 | 3 | - | - | 0.1 | 1 | 5 | - | 1 |
| | C-3 | - | - | - | 0.8 | 4 | - | - | - | 0.2 | - |
| Isocyanate crosslinking agent (D) | D-2 | 0.5 | 0.8 | - | 0.2 | 2 | - | - | - | - | - |
| Imidazole compound (E) | E-1 | 0.01 | - | - | 0.05 | - | - | - | - | - | - |
| | E-2 | - | 0.02 | - | - | 0.05 | 0.02 | - | - | 0.04 | - |
| | E-3 | - | - | - | - | - | - | - | 0.05 | - | - |
| | E-4 | - | - | - | - | - | - | - | - | - | - |
| Concentration of adhesive composition (wt%) | | 32 | 32 | 32 | 32 | 32 | 32 | 32 | 32 | 32 | 32 |
| Viscosity of adhesive composition (mPa·s) | Immediately after preparation | 3,000 | 1,000 | 500 | 1,000 | 1,500 | 500 | 2,000 | 1,000 | 1,000 | 1,000 |
| | After 12 hours | 3,100 | 1,500 | 500 | 1,000 | 2,200 | 500 | 2,200 | 1,000 | 900 | 1,000 |
| Gel fraction of adhesive composition (%) | Immediately after preparation | 92 | 93 | 90 | 96 | 97 | 94 | 89 | 96 | 95 | 90 |
| | After 7 days | 94 | 95 | 98 | 96 | 97 | 93 | 95 | 96 | 94 | 97 |
| Properties | Metal corrosion control and prevention properties | ○ | ○ | ○ | ○ | ○ | ○ | ○ | ○ | ○ | ○ |
| | Adhesive strength (N/25 mm) | 0.10 | 0.11 | 0.12 | 0.12 | 0.13 | 0.16 | 0.15 | 0.10 | 0.15 | 0.13 |
| | Adhesion to substrate | ○ | ○ | ○ | ○ | ○ | ○ | ○ | ○ | ○ | ○ |
| | Adherend contamination resistance | ○ | ○ | ○ | ○ | ○ | ○ | ○ | ○ | ○ | ○ |
| | Low-temperature stability | ○ | ○ | ○ | ○ | ○ | ○ | ○ | ○ | ○ | ○ |
| | Transparency of adhesive layer | ○ | ○ | ○ | ○ | ○ | ○ | ○ | ○ | ○ | ○ |
| | Autoclaving suitability | ○ | ○ | ○ | ○ | ○ | ○ | ○ | ○ | ○ | ○ |

FIG. 6: Table 9

| Composition (parts by weight) | | Comparative Example | | | | | | | | |
|---|---|---|---|---|---|---|---|---|---|---|
| | | 10 | 11 | 12 | 13 | 14 | 15 | 16 | 17 | 18 |
| Polymer (A) | | A-30 | A-31 | A-32 | A-33 | A-34 | A-35 | A-36 | A-37 | A-38 |
| | | 100 | 100 | 100 | 100 | 100 | 100 | 100 | 100 | 100 |
| Peroxide crosslinking agent (B) | B-1 | - | - | 0.1 | - | - | 0.3 | - | 0.05 | - |
| | B-2 | - | - | - | 0.5 | - | - | - | - | 2 |
| Carbodiimide crosslinking agent (C) | C-1 | 3 | - | - | 0.03 | - | 7 | - | 2 | 3 |
| | C-3 | - | - | - | - | - | - | - | - | - |
| Isocyanate crosslinking agent (D) | D-2 | - | 1 | 2 | - | 1 | 0.4 | 5 | - | - |
| | D-3 | - | - | - | - | - | - | - | - | - |
| Imidazole compound (E) | E-1 | - | - | - | - | - | - | - | 0.1 | - |
| | E-2 | - | - | - | - | - | - | - | - | - |
| | E-3 | - | - | - | - | - | 0.05 | - | - | - |
| | E-4 | - | - | - | - | - | - | - | - | 0.08 |
| Other additives (H) | H-1 | - | - | - | - | 0.5 | - | - | - | - |
| | H-2 | - | - | - | - | - | - | 0.015 | - | - |
| | H-3 | - | - | - | - | - | - | 2 | - | - |
| Concentration of adhesive composition (wt%) | | 32 | 32 | 32 | 32 | 32 | 32 | 32 | 32 | 32 |
| Viscosity of adhesive composition (mPa·s) | Immediately after preparation | 3,500 | 3,000 | 3,500 | 1,500 | 2,500 | 2,300 | 3,500 | 3,000 | 2,500 |
| | After 12 hours | 4,100 | 4,100 | 6,000 | 1,500 | 4,000 | 2,300 | Gelated | 3,000 | 2,500 |
| Gel fraction of adhesive composition (%) | Immediately after preparation | 0 | 0 | 10 | 25 | 60 | 95 | 63 | 0 | 92 |
| | After 7 days | 96 | 97 | 95 | 30 | 96 | 96 | 95 | 96 | 93 |
| Properties | Metal corrosion control and prevention properties | O | O | O | O | O | O | O | O | O |
| | Adhesive strength (N/25 mm) | 4 | 3 | 5 | 4 | 2 | 0.08 | 2 | 5 | 0.12 |
| | Adhesion to substrate | X | X | X | X | X | O | X | X | X |
| | Adherend contamination resistance | X | X | X | X | X | X | X | X | X |
| | Low-temperature stability | X | X | X | X | X | O | X | X | X |
| | Transparency of adhesive layer | O | O | O | O | O | X | O | O | O |
| | Autoclaving suitability | X | X | X | X | X | O | X | X | X |

FIG. 7: Table 10

| Composition of polymer (A) | | 39 | 40 | 41 | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|---|---|---|---|
| Sample | | A-39 | A-40 | A-41 | A-42 | A-43 | A-44 | A-45 | A-46 | A-47 | A-48 | A-49 | A-50 | A-51 | A-52 | A-53 | A-54 | A-55 | A-56 | A-57 |
| Monomer (parts by weight) | BA | 40 | - | 10.8 | 60 | 50 | 2 | 20 | 80 | 60.8 | 5 | 88 | 10 | 40 | 30 | - | 2 | 60 | 15 | 16 |
| | 2EHA | 59 | 98 | 80 | 30.5 | 46.5 | 89 | 78 | 18 | 38 | 92.5 | 6 | 89 | 58.5 | 66.2 | 93.8 | 97 | 35.8 | 82 | 80 |
| | VAc | - | - | - | 2.5 | - | - | - | - | - | - | 2.5 | - | - | - | - | - | - | - | - |
| | HEA | 1 | - | - | - | 3 | - | - | - | 0.2 | - | 3 | - | 1 | 0.8 | 6 | - | 4 | - | - |
| | 4HBA | - | - | - | - | - | 6 | - | 2 | - | 1 | - | 1 | - | - | - | - | - | 3 | - |
| | HEAA | - | 2 | 9 | - | - | - | 2 | - | - | 1 | - | - | - | - | - | 1 | - | - | 4 |
| | AM | - | - | - | - | 0.5 | - | - | - | - | 0.5 | 0.5 | - | 0.5 | - | 0.2 | - | 0.2 | - | - |
| | AA | - | - | 0.2 | 7 | - | 3 | - | - | 1 | - | - | - | - | 3 | - | - | - | - | - |
| Total (parts by weight) | | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 3500 | 1500 | 1000 | 4000 | 4500 | 1000 | 2500 | 6500 | 4000 | 1500 | 6000 | 3500 | 4000 | 3500 | 3000 | 2800 | 4000 | 3500 | 3000 |
| Solid content (%) | | 35 | 35 | 35 | 35 | 35 | 35 | 35 | 35 | 35 | 35 | 35 | 35 | 35 | 35 | 35 | 35 | 35 | 35 | 35 |
| Weight average molecular weight of polymer (A) in millions g/mol | | 0.8 | 0.3 | 0.5 | 0.75 | 0.85 | 0.35 | 0.5 | 0.9 | 0.7 | 0.4 | 0.9 | 0.6 | 0.8 | 0.7 | 0.4 | 0.4 | 0.89 | 0.5 | 0.5 |

Preparation Example

FIG. 8: Table 12

| Composition (parts by weight) | | Example | | | | | | | | | |
|---|---|---|---|---|---|---|---|---|---|---|---|
| | | 21 | 22 | 23 | 24 | 25 | 26 | 27 | 28 | 29 | 30 |
| Polymer (A) | | A-39 | A-40 | A-41 | A-42 | A-43 | A-44 | A-45 | A-46 | A-47 | A-48 |
| | | 100 | 100 | 100 | 100 | 100 | 100 | 100 | 100 | 100 | 100 |
| Peroxide crosslinking agent (B) | B-1 | 0.2 | - | 0.4 | 0.6 | - | - | 0.3 | - | 0.5 | - |
| | B-2 | - | 0.3 | - | - | 0.5 | 0.7 | - | 0.8 | - | 0.4 |
| Carbodiimide crosslinking agent (C) | C-1 | 0.3 | 0.7 | - | - | - | 0.1 | - | 0.5 | - | 1 |
| | C-2 | - | - | 3 | - | - | - | - | - | - | - |
| | C-3 | - | - | - | 0.4 | 2 | - | 1 | - | 0.2 | - |
| Isocyanate crosslinking agent (D) | D-2 | 0.2 | 0.8 | - | 0.2 | 1 | - | - | - | - | - |
| Imidazole compound (E) | E-1 | 0.01 | - | - | 0.05 | - | - | 0.1 | - | - | - |
| | E-2 | - | - | - | - | - | - | - | - | 0.04 | - |
| | E-3 | - | - | - | - | 0.05 | 0.02 | - | - | - | 0.07 |
| | E-4 | - | - | 0.03 | - | - | - | - | - | - | - |
| Concentration of adhesive composition (wt%) | | 32 | 32 | 32 | 32 | 32 | 32 | 32 | 32 | 32 | 32 |
| Viscosity of adhesive composition (mPa·s) | Immediately after preparation | 3,000 | 1,000 | 500 | 3,500 | 4,000 | 500 | 2,000 | 6,000 | 4,000 | 1,000 |
| | After 12 hours | 3,200 | 1,300 | 500 | 3,700 | 4,600 | 600 | 2,100 | 6,300 | 4,100 | 1,100 |
| Gel fraction of adhesive composition (%) | Immediately after preparation | 90 | 90 | 96 | 89 | 97 | 94 | 94 | 84 | 87 | 96 |
| | After 7 days | 92 | 95 | 98 | 92 | 97 | 95 | 95 | 90 | 89 | 97 |
| Properties | Metal corrosion control and prevention properties | O | O | O | O | O | O | O | O | O | O |
| | Adhesive strength (N/25 mm) | 1 | 0.15 | 0.17 | 5 | 0.30 | 0.20 | 0.15 | 10 | 3 | 0.10 |
| | Adhesion to substrate | O | O | O | O | O | O | O | O | O | O |
| | Adherend contamination resistance | O | O | O | O | O | O | O | O | O | O |
| | Low-temperature stability | O | O | O | O | O | O | O | O | O | O |
| | Transparency of adhesive layer | O | O | O | O | O | O | O | O | O | O |
| | Heat resistance | O | O | O | O | O | O | O | O | O | O |
| | Humidity/heat resistance | O | O | O | O | O | O | O | O | O | O |

FIG. 9: Table 13

| Composition (parts by weight) | | | Comparative Example | | | | | | | | | |
|---|---|---|---|---|---|---|---|---|---|---|---|---|
| | | | 19 | 20 | 21 | 22 | 23 | 24 | 25 | 26 | 27 |
| Polymer (A) | | | A-49 | A-50 | A-51 | A-52 | A-53 | A-54 | A-55 | A-56 | A-57 |
| | | | 100 | 100 | 100 | 100 | 100 | 100 | 100 | 100 | 100 |
| Peroxide crosslinking agent (B) | | B-1 | - | - | 0.1 | - | - | 0.3 | - | 0.05 | - |
| | | B-2 | - | - | - | 0.5 | - | - | - | - | 2 |
| Carbodiimide crosslinking agent (C) | | C-1 | 2 | - | - | - | - | - | - | 0.3 | 0.3 |
| | | C-2 | - | - | - | 0.03 | - | - | - | - | - |
| | | C-3 | - | - | - | - | - | 7 | - | - | - |
| Isocyanate crosslinking agent (D) | | D-2 | - | 1 | 2 | - | 1 | 0.4 | - | - | - |
| | | D-3 | - | - | - | - | - | - | 5 | - | - |
| Imidazole compound (E) | | E-1 | - | - | - | - | - | - | - | 0.5 | - |
| | | E-2 | - | - | - | 0.03 | - | - | - | - | - |
| | | E-3 | - | - | 0.04 | - | - | 0.05 | - | - | - |
| | | E-4 | - | - | - | - | - | - | - | - | 0.005 |
| Other additives (H) | | H-1 | - | - | - | - | 0.5 | - | - | - | - |
| | | H-2 | - | - | - | - | - | - | 0.015 | - | - |
| | | H-3 | - | - | - | - | - | - | 2 | - | - |
| | | H-4 | - | - | - | - | - | - | - | - | - |
| Concentration of adhesive composition (wt%) | | | 32 | 32 | 32 | 32 | 32 | 32 | 32 | 32 | 32 |
| Viscosity of adhesive composition (mPa·s) | Immediately after preparation | | 5,500 | 3,000 | 3,500 | 3,000 | 2,500 | 2,300 | 3,500 | 3,000 | 2,500 |
| | After 12 hours | | 6,200 | 4,100 | 6,000 | 3,100 | 4,000 | 2,300 | Gelated | 3,000 | 2,500 |
| Gel fraction of adhesive composition (%) | Immediately after preparation | | 0 | 0 | 0 | 1 | 60 | 96 | 63 | 96 | 45 |
| | After 7 days | | 94 | 97 | 95 | 30 | 96 | 96 | 95 | 96 | 93 |
| Properties | Metal corrosion control and prevention properties | | O | O | O | O | O | O | O | O | O |
| | Adhesive strength (N/25 mm) | | 4 | 3 | 12 | 30 | 2 | 0.08 | 2 | 0.12 | 3 |
| | Adhesion to substrate | | X | X | X | X | X | O | X | X | X |
| | Adherend contamination resistance | | X | X | X | X | X | X | X | O | X |
| | Low-temperature stability | | X | X | X | X | X | O | X | O | X |
| | Transparency of adhesive layer | | O | O | O | O | O | X | O | X | O |
| | Heat resistance | | X | X | X | X | X | X | X | X | X |
| | Humidity/heat resistance | | X | X | X | X | X | X | X | X | X |

ADHESIVE COMPOSITION

BACKGROUND

1. Field

Embodiments relate to an adhesive composition.

2. Description of the Related Art

Recently, flat panel displays (FPDs), such as liquid crystal displays (LCDs), plasma display panels (PDPs), and organic electroluminescent (EL) displays, have been increasingly used.

SUMMARY

Embodiments are directed to an adhesive composition.

The embodiments may be realized by providing an adhesive composition including 100 parts by weight of a (meth)acrylic copolymer having a weight average molecular weight of about 100,000 to about 2,000,000 g/mol; about 0.01 to about 5 parts by weight of a peroxide crosslinking agent; and about 0.001 to about 5 parts by weight of a carbodiimide.

The (meth)acrylic copolymer may be prepared from a monomer mixture including about 0 to about 9 parts by weight of a carboxyl group containing monomer, about 0 to about 9 parts by weight of a hydroxyl group containing (meth)acrylic monomer, and about 82 to about 99.9 parts by weight of a (meth)acrylic acid ester monomer, a total amount of the carboxyl group containing monomer and the hydroxyl group containing (meth)acrylic monomer being greater than 0 parts by weight and a total amount of the carboxyl group containing monomer, the hydroxyl group containing (meth)acrylic monomer, and the (meth)acrylic acid ester monomer being 100 parts by weight.

The adhesive composition may further include at least one of an isocyanate crosslinking agent and an imidazole compound, the imidazole compound being represented by Formula 1:

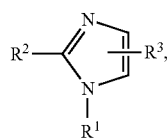

[Formula 1]

wherein, in Formula 1, $R^1$, $R^2$, and $R^3$ may each independently be a hydrogen atom, a halogen atom, or a substituted or unsubstituted C1 to C10 straight or branched alkyl group.

The composition may include the isocyanate crosslinking agent, the isocyanate crosslinking agent being present in an amount of about 0.05 to about 5 parts by weight, based on 100 parts by weight of the (meth)acrylic copolymer.

The composition may include the imidazole compound, the imidazole compound being present in an amount of about 0.05 to about 5 parts by weight, based on 100 parts by weight of the (meth)acrylic copolymer.

The adhesive composition may further include a silane coupling agent.

The embodiments may also be realized by providing an optical member including an adhesive layer prepared from the adhesive composition according to an embodiment.

The (meth)acrylic copolymer may have a weight average molecular weight of about 1,000,000 to about 1,800,000 g/mol, and the adhesive layer may have an adhesive strength of about 0.5 to about 9 N/25 mm according to JIS Z0237.

The adhesive layer may have a gel fraction of about 50 to about 95% under conditions of about 23° C. and about 50% RH after forming the adhesive composition into the adhesive layer.

The embodiments may also be realized by providing a surface protective film comprising an adhesive layer prepared from the adhesive composition according to an embodiment.

The (meth)acrylic copolymer may have a weight average molecular weight of about 150,000 to about 900,000 g/mol, and the adhesive layer may have an adhesive strength of about 0.05 to about 0.3 N/25 mm according to JIS Z0237.

The adhesive layer may have a gel fraction of about 70 to about 100% under conditions of about 23° C. and about 50% RH after forming the adhesive composition into the adhesive layer.

The embodiments may also be realized by providing an adhesive sheet comprising an adhesive layer prepared from the adhesive composition according to an embodiment.

The (meth)acrylic copolymer may have a weight average molecular weight of about 150,000 to about 950,000 g/mol, and the adhesive layer may have an adhesive strength of about 0.05 to about 20 N/25 mm according to JIS Z0237.

The adhesive layer may have a gel fraction of about 70 to about 100% under conditions of about 23° C. and about 50% RH after forming the adhesive composition into the adhesive layer.

BRIEF DESCRIPTION OF THE DRAWINGS

The embodiments will become apparent to those of ordinary skill in the art by describing in detail exemplary embodiments with reference to the attached drawings, in which:

FIG. 1 illustrates Table 2 listing properties for samples prepared in Preparation examples 1-19;

FIG. 2 illustrates Table 4 listing properties for samples prepared in Examples 1-10;

FIG. 3 illustrates Table 5 listing properties for samples prepared in Comparative Examples 1-9;

FIG. 4 illustrates Table 6 listing properties for samples prepared in Preparation examples 20-38;

FIG. 5 illustrates Table 8 listing properties for samples prepared in Examples 11-20;

FIG. 6 illustrates Table 9 listing properties for samples prepared in Comparative Examples 10-18;

FIG. 7 illustrates Table 10 listing properties for samples prepared in Preparation examples 39-57;

FIG. 8 illustrates Table 12 listing properties for samples prepared in Examples 21-30; and FIG. 9 illustrates Table 13 listing properties for samples prepared in Comparative Examples 19-27.

DETAILED DESCRIPTION

Japanese Patent Application No. 2010-244410, filed on Oct. 29, 2010, in the Japanese Intellectual Property Office and Korean Patent Application No. 10-2011-0054208, filed on Jun. 3, 2011, in the Korean Intellectual Property Office, and entitled: "Adhesive Composition," are incorporated by reference herein in their entireties.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present.

According to an embodiment, an adhesive composition may include, e.g., (A) 100 parts by weight of a (meth)acrylic copolymer having a weight average molecular weight of about 100,000 to about 2,000,000 g/mol; (B) about 0.01 to about 5 parts by weight of a peroxide crosslinking agent; and (C) about 0.001 to about 5 parts by weight of a carbodiimide crosslinking agent.

The adhesive composition may include the peroxide crosslinking agent (B) and the carbodiimide crosslinking agent (C) as crosslinking agents. When the peroxide crosslinking agent (B) and the carbodiimide crosslinking agent (C) are used together as crosslinking agents, the adhesive composition may have a long pot life and may exhibit practical adhesive performance immediately after adhesive processing (within 10 minutes after adhesive processing), without affecting adhesive properties, thereby substantially improving workability and productivity. Accordingly, it is possible to use the adhesive composition for various kinds of applications, e.g., adhesives for optical members, surface protective films, and adhesive sheets.

An adhesive layer formed of or prepared from the adhesive composition according to an embodiment may be used as an adhesive for an optical member, which may have proper adhesive strength and adhesion to a substrate, excellent metal corrosion control and prevention properties, light leakage resistance, durability, adherend contamination resistance, low-temperature stability, and reworkability.

Further, an adhesive layer formed of or prepared from the adhesive composition according to an embodiment may be used as adhesives for surface protective films, which may have proper adhesive strength or adhesion to a substrate, may exhibit excellent metal corrosion control and prevention properties, adherend contamination resistance, low-temperature stability, and transparency, and may control and/or prevent generation of bubbles under high-temperature and high-pressure conditions (in autoclaving).

In addition, an adhesive layer formed of or prepared from the adhesive composition according to an embodiment may be used as an adhesive for an adhesive sheet, which may have proper adhesive strength or adhesion to a substrate and may exhibit excellent metal corrosion control and prevention properties, adherend contamination resistance, low-temperature stability, transparency, heat resistance, and humidity/heat resistance.

Hereinafter, components of the adhesive composition according to an embodiment will be described in more detail. Herein, the term "(meth)acrylate" collectively refers to both acrylate and methacrylate. A (meth) compound will collectively refer to both a compound and a (meth)-containing compound. For example, "(meth)acryl" includes both acryl and methacryl, "(meth)acrylate" includes both acrylate and methacrylate, and "(meth)acrylic acid" includes both acrylic acid and methacrylic acid.

(Meth)acrylic Copolymer

The (meth)acrylic copolymer (A) according to an embodiment may be prepared from a monomer mixture including or consisting of (a1) about 0 to about 9 parts by weight of a carboxyl group containing monomer, (a2) about 0 to about 9 parts by weight of a hydroxyl group containing (meth)acrylic monomer, and (a3) about 82 to about 99.9 parts by weight of a (meth)acrylic acid ester monomer. Here, it should be noted that a total amount of the carboxyl group containing monomer (a1) and the hydroxyl group containing (meth)acrylic monomer (a2) may be greater than 0 parts by weight. Further, it should be noted that a total amount of the carboxyl group containing monomer (a1), the hydroxyl group containing (meth)acrylic monomer (a2) and the (meth)acrylic acid ester monomer (a3) may be about 100 parts by weight. The (meth)acrylic copolymer may have a weight average molecular weight of about 100,000 to about 2,000,000 g/mol.

(a1) Carboxyl Group Containing Monomer

The carboxyl group containing monomer (hereinafter, also referred to as "component (a1)") may be an unsaturated monomer having at least one carboxyl group. Examples of the carboxyl group containing monomer may include (meth)acrylic acid, maleic acid, maleic anhydride, fumaric acid, fumaric anhydride, crotonic acid, itaconic acid, itaconic anhydride, myristoleic acid, palmitoleic acid, oleic acid, and the like. These monomers may be used alone or in combination of two or more thereof.

In an implementation, (meth)acrylic acid, maleic acid, maleic anhydride, fumaric acid, fumaric anhydride, crotonic acid, itaconic acid, and itaconic anhydride are preferable; and (meth)acrylic acid is more preferable.

The carboxyl group containing monomer may be included in the monomer mixture in an amount of about 0 to about 9 parts by weight. Within this range, proper crosslinking points may be formed by reaction of the carboxyl group and the carbodiimide crosslinking agent (C), thereby securing flexibility of the adhesive composition as well as light leakage resistance and durability of an adhesive layer prepared from the composition.

(a2) Hydroxyl Group Containing (meth)acrylic Monomer

The hydroxyl group containing (meth)acrylic monomer (hereinafter, also referred to as "component (a2)") may be an acrylic monomer having a hydroxyl group in the molecule. Examples of the hydroxyl group containing (meth)acrylic monomer may include 2-hydroxyethyl(meth)acrylate, 4-hydroxybutyl(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxypropyl(meth)acrylate, 2-hydroxybutyl(meth)acrylate, 2-hydroxy-3-phenyloxypropyl(meth)acrylate, 4-hydroxycyclohexyl(meth)acrylate, N-2-hydroxyethyl(meth)acrylamide, cyclohexane dimethanol monoacrylate, and the like. In an implementation, the hydroxyl group containing (meth)acrylic monomer may include compounds obtained by addition reaction of a glycidyl group containing compound, such as alkyl glycidyl ether, allyl glycidyl ether, and glycidyl(meth)acrylate, with (meth)acrylic acid. These monomers may be used alone or in a combination thereof.

In an implementation, 2-hydroxyethyl(meth)acrylate, 4-hydroxybutyl (meth)acrylate, N-2-hydroxyethyl(meth)acrylamide, and cyclohexane dimethanol monoacrylate are preferable; and 2-hydroxyethyl(meth)acrylate, 4-hydroxybutyl (meth)acrylate, and N-2-hydroxyethyl(meth)acrylamide are more preferable.

The hydroxyl group containing (meth)acrylic monomer may be included in the monomer mixture in an amount of about 0 to about 9 parts by weight. Within this range, proper crosslinking points may be formed, thereby securing flexibility of the adhesive composition as well as light leakage resistance and durability of an adhesive layer.

(a3) (Meth)acrylic Acid Ester Monomer

The (meth)acrylic acid ester monomer (hereinafter, also referred to as "component (a3)") may be an ester of (meth)acrylic acid having no hydroxyl group in the molecule.

Examples of the (meth)acrylic acid ester monomer may include methyl(meth)acrylate, ethyl(meth)acrylate, propyl (meth)acrylate, isopropyl(meth)acrylate, n-butyl (meth)acrylate, isobutyl(meth)acrylate, tert-butyl(meth)acrylate, isoamyl(meth)acrylate, n-hexyl(meth)acrylate, n-heptyl (meth)acrylate, n-octyl(meth)acrylate, tert-octyl (meth)acrylate, 2-ethylhexyl(meth)acrylate, decyl(meth)acrylate, isodecyl(meth)acrylate, tridecyl(meth)acrylate, stearyl(meth) acrylate, isostearyl(meth)acrylate, phenyl (meth)acrylate, benzyl(meth)acrylate, dodecyl(meth)acrylate, tetrahydrofurfuryl (meth)acrylate, cyclohexyl(meth)acrylate, 4-n-butylcyclohexyl(meth)acrylate, 2-ethylhexyl diglycol (meth)acrylate, butoxyethyl(meth)acrylate, butoxymethyl (meth) acrylate, 3-methoxybutyl(meth)acrylate, 2-(2-methoxyethoxy)ethyl(meth)acrylate, 2-(2-butoxyethoxy) ethyl(meth)acrylate, 4-butylphenyl(meth)acrylate, phenyl (meth)acrylate, 2,4,5-trimethyl phenyl(meth)acrylate, phenoxymethyl(meth)acrylate, phenoxyethyl(meth)acrylate, polyethylene oxide monoalkyl ether (meth)acrylate, polypropylene oxide monoalkyl ether (meth)acrylate, trifluoroethyl (meth)acrylate, pentadecafluorooxyethyl(meth)acrylate, 2-chloroethyl(meth)acrylate, 2,3-dibromopropyl (meth) acrylate, and tribromophenyl(meth)acrylate, and the like. These (meth)acrylic acid ester monomers may be used alone or in combination of two or more thereof.

In an implementation, methyl(meth)acrylate, ethyl(meth) acrylate, n-butyl (meth)acrylate, and 2-ethylhexyl(meth) acrylate are preferable; and methyl(meth)acrylate, n-butyl (meth)acrylate, and 2-ethylhexyl(meth)acrylate are more preferable.

The (meth)acrylic acid ester monomer (a3) may be included in the monomer mixture in an amount of about 82 to about 99.9 parts by weight.

The (meth)acrylic copolymer (A) may be prepared by any suitable method, e.g., solution polymerization, emulsion polymerization, suspension polymerization, reverse-phase suspension polymerization, thin-film polymerization, and spray polymerization, which use a polymerization initiator. Polymerization control may be conducted by thermal insulation polymerization, temperature control polymerization, and isothermal polymerization. In addition to a method of using a polymerization initiator to initiate polymerization, irradiation, electromagnetic radiation, and UV radiation may be used to initiate polymerization. In an implementation, solution polymerization using a polymerization initiator may be used so that molecular weight is readily adjusted and impurities may be decreased. For example, the (meth)acrylic copolymer may be produced by adding about 0.01 to about 0.5 parts by weight of a polymerization initiator to about 100 parts by weight of the total amount of the monomers, using ethyl acetate, toluene, or methyl ethyl ketone as a solvent, followed by reaction under a nitrogen atmosphere at about 60 to about 90° C. for about 3 to about 10 hours. Examples of the polymerization initiator may include azo compounds, such as azobisisobutyronitrile (AIBN), 2-2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; and inorganic peroxides, such as hydrogen peroxide, ammonium persulfate, potassium persulfate, and sodium persulfate, and the like. These initiators may be used alone or in combination of two or more thereof.

As desired, the monomer mixture for preparing the copolymer may further include other monomers copolymerizable with the monomers (a1) to (a3). Examples of the other monomers may include an epoxy group containing acrylic monomer, such as glycidyl (meth)acrylate and methyl glycidyl (meth)acrylate; an amino group containing acrylic monomer, such as dimethylaminoethyl(meth)acrylate, diethylaminoethyl(meth)acrylate, N-tert-butylaminoethyl(meth)acrylate, and methacryloxyethyl trimethylammonium chloride (meth) acrylate; an amide group containing acrylic monomer, such as (meth)acrylamide, N-methylol (meth)acrylamide, N-methoxymethyl(meth)acrylamide, and N,N-methylene bis (meth)acrylamide; a phosphate group containing acrylic monomer, such as 2-methacryloyloxyethyl diphenyl phosphate (meth)acrylate, trimethacryloyloxyethyl phosphate (meth)acrylate, and triacryloyloxyethyl phosphate (meth) acrylate; a sulfonic acid group containing acrylic monomer, such as sodium sulfopropyl(meth)acrylate, sodium-2-sulfoethyl(meth)acrylate, and sodium-2-acrylamido-2-methylpropane sulfonate; a urethane group containing acrylic monomer, such as urethane (meth)acrylate; a phenyl group containing acrylic vinyl monomer, such as p-tert-butylphenyl (meth)acrylate and o-biphenyl(meth)acrylate; a silane group containing vinyl monomer, such as 2-acetoacetoxyethyl (meth)acrylate, vinyl trimethoxysilane, vinyltriethoxysilane, vinyl tris(β-methoxyethyl)silane, vinyl triacetylsilane, and methacryloyloxypropyltrimethoxysilane; and styrene, chlorostyrene, α-methylstyrene, vinyl toluene, vinyl chloride, vinyl acetate, vinyl propionate, acrylonitrile, and vinyl pyridine, and the like. These monomers may be used alone or in combination of two or more thereof.

In an implementation, (meth)acrylamide, glycidyl(meth) acrylate, dimethylaminoethyl(meth)acrylate, 2-acetoacetoxyethyl(meth)acrylate, and vinyl acetate are preferable; and (meth)acrylamide and vinyl acetate are more preferable.

The other monomers may be included in the monomer mixture in an amount of about 0.1 to about 10 parts by weight, e.g., about 0.2 to about 5 parts by weight or about 0.3 to about 3 parts by weight, based on about 100 parts by weight of the total amount of the monomers (a1) to (a3).

The (meth)acrylic copolymer (A) prepared by copolymerization of the above monomers may have a weight average molecular weight Mw of about 100,000 to about 2,000,000 g/mol. Maintaining the weight average molecular weight at about 100,000 or greater may help ensure that sufficient heat resistance is obtained. Maintaining the weight average molecular weight at about 2,000,000 or less may help ensure sufficient adhesion is obtained and may help prevent a reduction in tack. Herein, the weight average molecular weight is based on a polystyrene standard measured by the method stated in the following examples.

It should be noted that a total amount of the monomer (a1) and the monomer (a2) may be greater than 0 parts by weight. For example, the (meth)acrylic copolymer (A) may include at least one of a constituent or repeating unit derived from the monomer (a1) and a constituent or repeating unit derived from the monomer (a2). In an implementation, a total amount of the monomers (a1), (a2), and (a3) is about 100 parts by weight.

The (meth)acrylic copolymer (A) may be used alone or in combination of two or more polymers.

(B) Peroxide Crosslinking Agent

The adhesive composition may include the peroxide crosslinking agent (hereinafter, also referred to as "component (B)") in addition to the copolymer (A). The peroxide crosslinking agent may generate radicals by heating, and may generate radicals in the (meth)acrylic copolymer (A) through extraction of hydrogen from the (meth)acrylic copolymer (A) to react therewith, thereby forming a cross-linked structure.

The peroxide crosslinking agent may include any suitable peroxide crosslinking agent, e.g., di(2-ethylhexyl)peroxydicarbonate, di(4-t-butylcyclohexyl)peroxydicarbonate, di-sec-butylperoxydicarbonate, t-butylperoxyneodecanoate, t-hexylperoxypivalate, t-butylperoxypivalate, dilauroylperoxide, di-n-octanoylperoxide, 1,1,3,3-tetramethylbutylperoxy-2-ethylhexanoate, di(4-methylbenzoyl)peroxide, benzoyl peroxide, t-butylperoxybutylate, and the like.

In an implementation, in terms of cross-linking efficiency, di(4-t-butylcyclohexyl)peroxydicarbonate, dilauroyl peroxide, and dibenzoyl peroxide are preferable, and di(4-t-butylcyclohexyl)peroxydicarbonate and benzoyl peroxide are more preferable.

The peroxide crosslinking agent (B) may be present in an amount of about 0.01 to about 5 parts by weight, e.g., about 0.1 to about 0.8 parts by weight, based on 100 parts by weight of the composition (A). Within this range, a proper cross-linked structure may be formed, thereby realizing excellent heat resistance. Maintaining the amount of peroxide crosslinking agent (B) at about 0.01 parts by weight or greater may help ensure that a sufficiently cross-linked structure is formed, thereby ensuring heat resistance. Maintaining the amount of peroxide crosslinking agent (B) at about 5 parts by weight or less may help prevent excessive performance of the cross-linking reaction, thereby preventing a decrease in tack and ensuring the ability to deal with contraction of a polarizer plate over time, thereby preventing a reduction in light leakage resistance durability.

The component (B) may be used alone or in combination of two or more thereof.

(C) Carbodiimide Crosslinking Agent

The adhesive composition may include the carbodiimide crosslinking agent (hereinafter, also referred to as "component (C)") in addition to the components (A) and (B). The carbodiimide crosslinking agent may react with and may be coupled with a hydroxyl group and/or a carboxyl group of the (meth)acrylic copolymer (A), thereby forming a cross-linked structure.

The carbodiimide crosslinking agent may include any suitable carbodiimide crosslinking agent, e.g., a compound having at least two carbodiimide groups (—N=C=N—) and/or any suitable polycarbodiimide.

In an implementation, the carbodiimide compound may include high-molecular-weight polycarbodiimide prepared by decarbonation condensation reaction of diisocyanate in the presence of a carbodiimide catalyst.

Examples of the compound may include compounds obtained by decarbonation condensation reaction of the following diisocyanates.

Examples of the diisocyanates may include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate, which may be used alone or in combination of two or more thereof.

The carbodiimide catalyst may include phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, and 3-phospholene isomers thereof.

These high-molecular-weight polycarbodiimides may be obtained by synthesis or from commercially available products. Examples of commercially available products of the component (B) may include CARBODILITE® (Nisshinbo Chemical Inc.), e.g., CARBODILITE® V-01, V-03, V-05, V-07, and V09, which may have excellent compatibility with organic solvents.

The carbodiimide crosslinking agent (C) may be used alone or in combination of two or more thereof.

The carbodiimide crosslinking agent (C) may be present in an amount of about 0.001 to about 5 parts by weight, based on 100 parts by weight of the (meth)acrylic copolymer (A). Within this range, a proper cross-linked structure may be formed, thereby realizing excellent heat resistance. In addition, the component (C) may promote cross-linking effects of the peroxide crosslinking agent. Accordingly, the adhesive composition according to the present embodiment may exhibit practical adhesive performance immediately after adhesive processing (e.g., within 10 minutes after adhesive processing), thereby helping substantially improve productivity. Maintaining the amount of carbodiimide crosslinking agent (C) at about 0.001 parts by weight or greater may help ensure that a sufficiently cross-linked structure is formed, thereby helping to prevent a reduction in heat resistance. Furthermore, the carbodiimide crosslinking agent may help promote cross-linking effects of the peroxide crosslinking agent without a specific aging time such that the adhesive composition achieves practical adhesive performance. Maintaining the amount of carbodiimide crosslinking agent (C) at about 5 parts by weight or less may help prevent excessive performance of the cross-linking reaction and a decrease in tack, thereby ensuring the ability of the adhesive composition to deal with contraction of a polarizer plate over time and preventing a reduction in light leakage resistance durability.

(D) Isocyanate Crosslinking Agent

The adhesive composition may include an isocyanate crosslinking agent (hereinafter, also referred to as "component (D)") in addition to the components (A), (B), and (C). When the isocyanate crosslinking agent (D) is added, an adhesive layer prepared from the composition may exhibit improved durability.

Any suitable isocyanate crosslinking agent may be used, e.g., aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), toluidine diisocyanate (TODI), and 1,5-naphthalene diisocyanate (NDI); aliphatic diisocyanates, such as hexamethylene diisocyanate (HDI), trimethylhexamethylene diisocyanate (TMHDI), lysine diisocyanate, and norbornane diisocyanate (NBDI); alicyclic diisocyanates, such as trans-cyclohexane-1,4-diisocyanate, isophorone diisocyanate (IPDI), H6-XDI (hydrogen added XDI), and H12-MDI (hydrogen added MDI); carbodiimide-modified diisocyanates of the foregoing diisocyanates; or isocyanurate-modified diisocyanates thereof. In an implementation, adducts of the foregoing isocyanate compounds and polyol compounds, such as trimethylolpropane, or biurets and isocyanurates of the isocyanate compounds, may be suitably used.

The isocyanate crosslinking agent (D) may be obtained by synthesis or from commercially available products. Examples of commercially available products of the isocyanate crosslinking agent (D) may include Coronate® L, Coronate® HL, Coronate® 2030, Coronate® 2031 (all available from Nippon Polyurethane Industry Co., Ltd.); Takenate® D-102, Takenate® D-110N, Takenate® D-200, Takenate® D-202 (all available from Mitsui Chemicals Inc.); Duranate™ 24A-100, Duranate™ TPA-100, Duranate™ TKA-100, Duranate™ P301-75E, Duranate™ E402-90T, Duranate™

E405-80T, Duranate™ TSE-100, Duranate™ D-101, and Duranate™ D-201 (all available from Asahi Kasei Corporation); and the like.

In an implementation, Coronate® L, Coronate® HL, Takenate® D-110N, and Duranate™ TPA-100 are preferable; and Coronate® L and Duranate™ TPA-100 are more preferable.

The isocyanate crosslinking agent (D) may be used alone or in combination of two or more thereof.

If present, the isocyanate crosslinking agent (D) may be present in an amount of about 0.05 to about 5 parts by weight, based on 100 parts by weight of the (meth)acrylic copolymer (A). Within this range, the adhesive composition may have proper durability. In an implementation, the isocyanate crosslinking agent may be present in an amount of about 0.07 to about 4 parts by weight, e.g., about 0.1 to about 3 parts by weight.

(E) Imidazole Compound

The adhesive composition may include an imidazole compound (hereinafter, also referred to as "component (E)") in addition to the components (A), (B), and (C). The imidazole compound may be considered to function as a cross-linking (curing) accelerator with respect to the carbodiimide crosslinking agent (C). The adhesive composition including both the carbodiimide crosslinking agent (C) and the imidazole compound (E) may obtain practical adhesive properties within a short aging time, thereby providing excellent productivity.

The imidazole compound may represented by Formula 1, below.

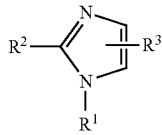

[Formula 1]

In Formula 1, $R^1$, $R^2$, and $R^3$ may each independently be a hydrogen atom, a halogen atom, or a substituted or unsubstituted C1 to C10 straight or branched alkyl group.

Examples of the halogen may include a fluorine atom, a chlorine atom, a bromine atom, and/or an iodine atom.

Examples of the C1 to C10 straight or branched alkyl group may include a methyl group, an ethyl group, an n-propyl group, an isopropyl group, an n-butyl group, an isobutyl group, a sec-butyl group, a tert-butyl group, an n-pentyl group, an isoamyl group, a tert-pentyl group, a neopentyl group, an n-hexyl group, a 3-methylpentane-2-yl group, a 3-methylpentane-3-yl group, a 4-methylpentyl group, a 4-methylpentane-2-yl group, a 1,3-dimethylbutyl group, a 3,3-dimethylbutyl group, 3,3-dimethylbutane-2-yl group, an n-heptyl group, a 1-methylhexyl group, a 3-methylhexyl group, a 4-methylhexyl group, a 5-methylhexyl group, a 1-ethylpentyl group, a 1-(n-propyl)butyl group, a 1,1-dimethylpentyl group, a 1,4-dimethylpentyl group, a 1,1-diethylpropyl group, a 1,3,3-trimethylbutyl group, a 1-ethyl-2,2-dimethylpropyl group, an n-octyl group, a 2-ethylhexyl group, a 2-methylhexane-2-yl group, a 2,4-dimethylpentane-3-yl group, a 1,1-dimethylpentane-1-yl group, a 2,2-dimethylhexane-3-yl group, a 2,3-dimethylhexane-2-yl group, a 2,5-dimethylhexane-2-yl group, a 2,5-dimethylhexane-2-yl group, a 3,4-dimethylhexane-3-yl group, a 3,5-dimethylhexane-3-yl group, a 1-methylheptyl group, a 2-methylheptyl group, a 5-methylheptyl group, a 2-methylheptane-2-yl group, a 3-methylheptane-3-yl group, a 4-methylheptane-3-yl group, a 4-methylheptane-4-yl group, a 1-ethylhexyl group, a 2-ethylhexyl group, a 1-propylpentyl group, a 2-propylpentyl group, a 1,1-dimethylhexyl group, a 1,4-dimethylhexyl group, a 1,5-dimethylhexyl group, a 1-ethyl-1-methylpentyl group, a 1-ethyl-4-methylpentyl group, a 1,1,4-trimethylpentyl group, a 2,4,4-trimethylpentyl group, a 1-isopropyl-1,2-dimethylpropyl group, a 1,1,3,3-tetramethylbutyl group, an n-nonyl group, a 1-methyloctyl group, a 6-methyloctyl group, a 1-ethylheptyl group, a 1-(n-butyl)pentyl group, a 4-methyl-1-(n-propyl)pentyl group, a 1,5,5-trimethylhexyl group, a 1,1,5-trimethylhexyl group, a 2-methyloctane-3-yl group, an n-decyl group, a 1-methylnoyl group, a 1-ethyloctyl group, a 1-(n-butyl)hexyl group, a 1,1-dimethyloctyl group, and a 3,7-dimethyloctyl group, and the like.

The alkyl group may be substituted by a substituent. Examples of the substituent may include a halogen atom, such as a fluorine atom, a chlorine atom, a bromine atom, and an iodine atom; an alkyl group, such as a methyl group, an ethyl group, a tert-butyl group, and a dodecyl group; an aryl group, such as a phenyl group, a p-tolyl group, a xylyl group, a cumenyl group, a naphthyl group, an anthryl group, and a phenanthryl group; an alkoxy group, such as a methoxy group, an ethoxy group, and a tert-butoxy group; an aryloxy group, such as a phenoxy group and a p-tolyloxy group; an alkoxycarbonyl group, such as a methoxycarbonyl group, a butoxycarbonyl group, an octyloxycarbonyl group, and a phenoxycarbonyl group; an acyloxy group, such as an acetoxy group, a propionyloxy group, a methacryloyloxy group, and a benzoyloxy group; an acyl group, such as an acetyl group, a benzoyl group, an isobutylyl group, an acryloyl group, a methacryloyl group, a methoxalyl group; an alkylamino group, such as a methylamino group and a cyclohexylamino group; a dialkylamino group, such as a dimethylamino group, a diethylamino group, a morpholino group, and a piperidino group; an arylamino group, such as a phenylamino group and a p-tolylamino group; a hydroxyl group, a carboxyl group, a formyl group, an amino group, a nitro group, a cyano group, a trifluoromethyl group, and a trichloromethyl group, and the like.

Examples of the imidazole compound represented by Formula 1 may include imidazole, 1-methylimidazole, 2-methylimidazole, 4-methylimidazole, 1-ethylimidazole, 2-ethylimidazole, 4-ethylimidazole, 1-propylimidazole, 2-propylimidazole, 4-propylimidazole, 1-butylimidazole, 2-butylimidazole, 4-butylimidazole, 1-pentylimidazole, 2-pentylimidazole, 4-pentylimidazole, 1-hexylimidazole, 2-hexylimidazole, 4-hexylimidazole, 1-heptylimidazole, 2-heptylimidazole, 4-heptylimidazole, 1-octylimidazole, 2-octylimidazole, 4-octylimidazole, 1-nonylimidazole, 2-nonylimidazole, 4-nonylimidazole, 1-decylimidazole, 2-decylimidazole, 4-decylimidazole, 1,2-dimethylimidazole, 1,2-diethylimidazole, 1-ethyl-2-methylimidazole, 2-ethyl-4-methylimidazole, 1,4-dimethylimidazole, 1,5-dimethylimidazole, 1,2,4-trimethylimidazole, 1,4-dimethyl-2-ethylimidazole, 2-fluoroimidazole, 4-fluoroimidazole, 2-bromoimidazole, 4-bromoimidazole, 2-iodoimidazole, and 4-iodoimidazole, and the like.

In an implementation, a compound represented by Formula 1 in which at least one of $R^1$, $R^2$, and $R^3$ is a substituted or unsubstituted C1 to C10 straight or branched alkyl group is preferable; and 1-methylimidazole, 1-ethylimidazole, 1-propylimidazole, 1-butylimidazole, 1,2-dimethylimidazole, and 2-ethyl-4-methylimidazole are more preferable in view of productivity and price.

The imidazole compound (E) may be present in an amount of about 0.005 to about 0.2 parts by weight, based on 100 parts by weight of the (meth)acrylic copolymer (A). Within this range, sufficient curing acceleration effects and sufficient adhesive strength may be obtained, and a long aging time may not needed be after adhesive processing. In an implementation, the amount of imidazole compound may be about 0.007 to about 0.2 parts by weight, e.g., about 0.01 to about 0.2 parts by weight or about 0.01 to about 0.15 parts by weight.

The imidazole compound (E) may be used alone or in combination of two or more thereof. Further, the imidazole compound (E) may be obtained by synthesis or from commercially available products.

The adhesive composition may include a silane coupling agent (hereinafter, also referred to as "component (F)") in addition to the above components. When the silane coupling agent is added, reactivity may be improved and mechanical strength and adhesive strength of a cross-linked product may be enhanced. Any silane suitable coupling agent may be used, e.g., methyltrimethoxysilane, dimethyldimethoxysilane, trimethylmethoxysilane, n-propyltrimethoxysilane, ethyltrimethoxysilane, diethyldiethoxysilane, n-butyltrimethoxysilane, n-hexyltriethoxysilane, n-octyltrimethoxysilane, phenyltrimethoxysilane, diphenyldimethoxysilane, cyclohexylmethyldimethoxysilane, vinyltrichlorosilane, vinyltrimethoxysilane, vinyltriethoxysilane, vinyl tris(β-methoxyethoxy)silane, β-(3,4-epoxycyclohexyl) ethyltrimethoxysilane, 3-glycidoxyprolylmethyldiethoxysilane, γ-glycidoxypropyltrimethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, γ-mercaptopropylmethyldimethoxysilane, bis[3-(triethoxysilyl)propyl]tetrasulfide, and γ-isocyanatopropyltriethoxysilane, and the like. Further, a compound having a hydrolytic silyl group (that is obtained by reaction of a silane coupling agent having a functional group, such as an epoxy group (glycidoxy group), an amino group, a mercapto group, and a (meth)acryloyl group, a silane coupling agent having a functional group reactive to the foregoing functional groups, other coupling agents, and polyisocyanate at a certain ratio with respect to each functional group) may be used.

As the silane coupling agent (F), an oligomeric silane coupling may be used. The oligomeric silane coupling agent may have a —Si—O—Si— structure formed by, e.g., condensation of two or more silane compounds, in which each may have at least an alkoxy group. The —Si—O—Si— structure may be formed such that at least one alkoxy group is bonded to one of the silicon atoms. The oligomeric silane coupling agent may include an organic functional group.

Examples of the organic functional group may include vinyl, epoxy, styryl, (meth)acryloyl, methacryloxy, acryloxy, amino, ureido, chloropropyl, mercapto, and polysulfide groups. In an implementation, epoxy, mercapto, and (meth) acryloyl groups are preferable; and epoxy and mercapto groups are particularly preferable in order to simultaneously attain improved durability and low tack of an adhesive layer prepared from the composition.

The oligomeric silane coupling agent may be an oligomer that has two silicon atoms (i.e. a dimer) to about 100 silicon atoms in one molecule, e.g., may have an average degree of polymerization of about 2 to about 100. The oligomeric silane coupling agent may become viscous with an increasing average degree of polymerization. Accordingly, the average degree of polymerization of the oligomeric silane coupling agent may be about 2 to about 80, e.g., about 3 to about 50, which may help prevent the oligomeric silane coupling agent from forming a paste or solid form, thereby easing handling.

The organic functional group included in the oligomeric silane coupling agent may be bonded to a silicon atom via a linker. Examples of suitable linkers may include alkylene groups, such as methylene, ethylene, trimethylene, hexamethylene, and decamethylene groups; divalent hydrocarbon groups interrupted by an aromatic ring, such as methylphenylethyl; and divalent aliphatic groups interrupted by an oxygen atom, such as methoxymethyl, methoxyethyl, and methoxypropyl groups. When the organic functional group is an epoxy group, a functional group may be formed between two adjacent carbon atoms forming a ring.

The oligomeric silane coupling agent may be a cooligomer obtained by partial co-hydrolysis and polycondensation of a tetraalkoxysilane and a silane compound represented by Formula 2, below

[Formula 2]

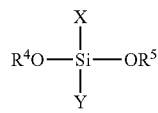

In Formula 2, $R^4$ and $R^5$ may each independently be an alkyl or phenyl group, X may be an organic group having a mercapto, epoxy, or (meth)acryloyloxy group, and Y may be an alkyl, alkoxy, phenyl, phenoxy, aralkyl, or aralkyloxy group.

$R^4$ and $R^5$ in Formula 2 may be independent of each other, e.g., a C1 to C10 alkyl group. For example, $R^4$ and $R^5$ may each independently be a methyl or ethyl group.

Examples of the organic functional group represented by X may include mercaptomethyl, 3-mercaptopropyl, 6-mercaptohexyl, 10-mercaptodecyl, 2-(4-mercaptomethylphenyl) ethyl, glycidoxymethyl, 3-glycidoxypropyl, 2-(3,4-epoxycyclohexyl)ethyl, acryloyloxymethyl, 3-acryloyloxypropyl, methacryloyloxymethyl, and 3-methacryloyloxypropyl groups.

In an implementation, Y may be a C1 to C10 alkyl or alkoxy group or a C7 to C10 aralkyl or aralkyloxy group.

Examples of the functional group-containing silane compound represented by Formula 2 may include mercaptomethyltrimethoxysilane, 3-mercaptopropyltrimethoxysilane, 3-mercaptopropyltriethoxysilane, 2-(4-mercaptomethylphenyl)ethyltrimethoxysilane, 6-mercaptohexyltrimethoxysilane, 10-mercaptodecyltrimethoxysilane, 3-mercaptopropylmethyldimethoxysilane, 3-mercaptopropylmethyldiethoxysilane, glycidoxymethyltrimethoxysilane, 3-glycidoxypropyltrimethoxysilane, 2-(3, 4-epoxycyclohexyl)ethyltrimethoxysilane, 3-glycidoxypropylmethyldimethoxysilane, acryloyloxymethyltrimethoxysilane, 3-acryloyloxypropyltrimethoxysilane, 3-acryloyloxypropyltriethoxysilane, methacryloyloxymethyltrimethoxysilane, 3-methacryloyloxypropyltrimethoxysilane, 3-methacryloyloxypropyltriethoxysilane, 3-methacryloyloxypropyltributoxysilane, 3-acryloyloxypropylmethyldimethoxysilane, 3-methacryloyloxypropylmethyldimethoxysilane, and 3-methacryloyloxypropylmethyldiethoxysilane.

The tetraalkoxysilane, which may be partially co-hydrolyzed and polycondensed with the functional group-containing silane compound represented by Formula 2, may have four alkoxy groups bonded to each silicon atom. Each of the alkoxy groups may have 1 to 10 carbon atoms. The four alkoxy groups bonded to the silicon atom may be the same or different. In terms of ease of production and purchase, a compound having the same alkoxy groups bonded to a silicon atom may be used, e.g., tetramethoxysilane, tetraethoxysilane, tetrapropoxysilane, and tetrabutoxysilane.

The oligomeric silane coupling agent may be prepared by partial co-hydrolysis and polycondensation of the functional group-containing silane compound represented by Formula 2 and the tetraalkoxysilane. In this case, the alkoxysilyl or phenoxysilyl groups as —$OR^4$ or —$OR^5$ bonded to the silicon atom may be partially hydrolyzed to form a silanol group. The alkoxysilyl groups of the tetraalkoxysilane may be partially hydrolyzed to form a silanol group. Condensation of the two silanol groups may yield the oligomeric silane coupling agent. Use of the oligomer is preferred due to its tendency to help prevent the adhesive composition from being dispersed during coating and drying.

Examples of the monomeric oligomeric silane coupling agent are as follows.

As mercaptomethyl group-containing cooligomers, there may be exemplified mercaptomethyltrimethoxysilane-tetramethoxysilane, mercaptomethyltrimethoxysilane-tetraethoxysilane, mercaptomethyltriethoxysilane-tetramethoxysilane, and mercaptomethyltriethoxysilane-tetraethoxysilane cooligomers, and the like.

As mercaptopropyl group-containing cooligomers, there may be exemplified 3-mercaptopropyltrimethoxysilane-tetramethoxysilane, 3-mercaptopropyltrimethoxysilane-tetraethoxysilane, 3-mercaptopropyltriethoxysilane-tetramethoxysilane, and 3-mercaptopropyltriethoxysilane-tetraethoxysilane cooligomers, and the like.

As glycidoxymethyl group-containing cooligomers, there may be exemplified glycidoxymethyltrimethoxysilane-tetramethoxysilane, glycidoxymethyltrimethoxysilane-tetraethoxysilane, glycidoxymethyltriethoxysilane-tetramethoxysilane, and glycidoxymethyltriethoxysilane-tetraethoxysilane cooligomers, and the like.

As glycidoxypropyl group-containing cooligomers, there may be exemplified 3-glycidoxypropyltrimethoxysilane-tetramethoxysilane, 3-glycidoxypropyltrimethoxysilane-tetraethoxysilane, 3-glycidoxypropyltriethoxysilane-tetramethoxysilane, and 3-glycidoxypropyltriethoxysilane-tetraethoxysilane cooligomers, and the like.

As methacryloyloxypropyl group-containing cooligomers, there may be exemplified acryloyloxypropyl group-containing cooligomers, such as 3-acryloyloxypropyltrimethoxysilane-tetramethoxysilane, 3-acryloyloxypropyltrimethoxysilane-tetraethoxysilane, 3-acryloyloxypropyltriethoxysilane-tetramethoxysilane, 3-acryloyloxypropyltriethoxysilane-tetraethoxysilane, 3-acryloyloxypropylmethyldimethoxysilane-tetramethoxysilane, 3-acryloyloxypropylmethyldimethoxysilane-tetraethoxysilane, 3-acryloyloxypropylmethyldiethoxysilane-tetramethoxysilane, and 3-acryloyloxypropylmethyldiethoxysilane-tetraethoxysilane cooligomers, 3-methacryloyloxypropyltrimethoxysilane-tetramethoxysilane, 3-methacryloyloxypropyltrimethoxysilane-tetraethoxysilane, 3-methacryloyloxypropyltriethoxysilane-tetramethoxysilane, 3-methacryloyloxypropyltriethoxysilane-tetraethoxysilane, 3-methacryloyloxypropylmethyldimethoxysilane-tetramethoxysilane, 3-methacryloyloxypropylmethyldimethoxysilane-tetraethoxysilane, 3-methacryloyloxypropylmethyldiethoxysilane-tetramethoxysilane, and 3-methacryloyloxypropylmethyldiethoxysilane-tetraethoxysilane cooligomers, and the like.

The silane coupling agent may be obtained by synthesis or from commercially available products. Examples of commercially available products applicable for use as the silane coupling agent may include KBM-303, KBM-403, KBE-402, KBE-403, KBE-502, KBE-503, KBM-5103, KBM-573, KBM-802, KBM-803, KBE-846, KBE-9007 (all available from Shin-Etsu Chemical Co., Ltd.); X-41-1805, X-41-1810, X-41-1053, and X-41-1058 (Trade names, all available from Shin-Etsu Chemical Co. Ltd). X-41-1805 is an oligomeric silane coupling agent having mercapto, methoxy and ethoxy groups, X-41-1810 is an oligomeric silane coupling agent having mercapto, methyl and methoxy groups, X-41-1053 is an oligomeric silane coupling agent having epoxy, methoxy and ethoxy groups, and X-41-1058 is an oligomeric silane coupling agent having epoxy, methyl and methoxy groups.

In an implementation, KBM-303, KBM-403, KBE-402, KBE-403, KBM-5103, KBM-573, KBM-802, KBM-803, KBE-846, KBE-9007, X-41-1805, and X-41-1810 are preferable; and KBM-403 and X-41-1810 are more preferable. The silane coupling agents may be used alone or in combination thereof.

The amount of silane coupling agent is not particularly limited. For example, the silane coupling agent (F) may be present in an amount of about 0.03 to about 1 part by weight, e.g., about 0.05 to about 0.5 parts by weight or about 0.1 to about 0.3 parts by weight, based on 100 parts by weight of the (meth)acrylic copolymer (A). Within this range, excellent heat resistance and adhesion may be obtained.

The adhesive composition may include additives in addition to or instead of the silane coupling agent. Examples of the additives may include curing accelerators, ionic liquid, lithium salt, inorganic fillers, softeners, antioxidants, anti-aging agents, stabilizers, tackifier resins, reforming resins (polyol resin, phenolic resin, acrylic resin, polyester resin, polyolefin resin, epoxy resin, epoxylated poly-butadiene resin, etc.), leveling agents, antifoaming agents, plasticizers, dyes, pigments (coloring and extender pigments), treatment agents, UV blocking agents, fluorescent whitening agents, dispersants, heat stabilizers, light stabilizers, UV absorbers, anti-static agents, lubricants, and solvents and the like. In particular, examples of the curing accelerator may include dibutyltin dilaurate, JCS-50 (Johoku Chemical Company Ltd.), and Formate TK-1 (Mitsui Chemicals Inc.). Examples of the ionic liquid may include materials having cations, such as phosphonium, pyridinium, pyrrolidinium, imidazolium, guanidinium, ammonium, isouronium, thiouronium, piperidium, pyrazolium, and sulfonium ions, and materials having anions, such as halides, nitrates, sulfates, phosphates, perchlorates, thiocyanate, thiosulfate, sulfites, tetrafluoroborate, hexafluorophosphate, formate, oxalate, acetate, trifluoroacetate, and alkyl sulfonate ions. Examples of the antioxidant may include dibutylhydroxytoluene (BHT), Irganox® 1010, Irganox® 1035FF, and Irganox® 565 (all available from BASF Japan Co., Ltd.). Examples of the tackifier resin may include rosins, such as rosin acid, polymerized rosin acid, and rosin acid esters, terpene resins, terpene phenolic resin, aromatic hydrocarbon resins, aliphatic saturated hydrocarbon resins, and petroleum resins. If the adhesive composition includes these additives, the amount of the additives may be about 0.1 to about 20 parts by weight, based on 100 parts by weight of a total amount of the components (A) to (C).

The adhesive composition according to an embodiment may be prepared by mixing the above components at once or in order, or mixing a plurality of random components first and then adding the remaining components, and stirring the components to homogeneity. For example, the adhesive composition may be prepared by heating the components to about 20° C. to about 40° C., as desired, and stirring using a stirrer for about 5 minutes to about 5 hours until the mixture becomes uniform.

In an implementation, a viscosity of the adhesive composition may be about 300 to about 7,000 mPa·s at about 25° C., immediately after preparation (i.e., within about 10 minutes after mixing the components for a predetermined time) in order to facilitate coating and control of the thickness of an adhesive layer to be formed of the adhesive composition. In an implementation, for an adhesive of an optical member, the adhesive composition may have a viscosity about 2,000 to about 6,000 mPa·s, e.g., about 2,500 to about 5,000 mPa·s, at about 25° C. immediately after preparation (within about 10 minutes after mixing the components for a predetermined time). When used as adhesives for surface protective films, the adhesive composition may have a viscosity about 350 to about 5,000 mPa·s, e.g., about 400 to about 4,000 mPa·s, at about 25° C. immediately after preparation (within about 10 minutes after mixing the components for a predetermined time). When used as adhesives for adhesive sheets, the adhesive composition may have a viscosity about 350 to about 6,800 mPa·s, e.g., about 400 to about 6,500 mPa·s, at about 25° C. immediately after preparation (within about 10 minutes after mixing the components for a predetermined time). In the present embodiment, the viscosity may be measured by the process described in the following examples.

The adhesive composition may have an excellent pot life as excessive viscosity increase or gelation of the adhesive composition may be controlled after preparation.

Pot life may be evaluated by comparing a viscosity of the composition immediately after preparation of the adhesive composition with a viscosity of the composition about 12 hours after preparation. For example, it may be preferable that the composition is not gelated about 12 hours after preparation. It may be more preferable that the viscosity of the adhesive composition about 12 hours after preparation is increased by about 50% or less, compared with the viscosity of the composition immediately after preparation. Within this range, the adhesive composition may have excellent workability. Still more preferably, the viscosity of the adhesive composition about 12 hours after preparation may be increased by about 15% or less, compared with the viscosity of the composition immediately after preparation.

Herein, with regard to the viscosity, the expression "immediately after" in "immediately after preparation of the adhesive composition" may refer to "within about 10 minutes". For example, "the viscosity of the adhesive composition immediately after preparation of the composition" may refer to the viscosity of the adhesive composition measured within about 10 minutes after completion of preparation of the adhesive composition (after mixing the components for a predetermine period of time).

An adhesive layer prepared from the adhesive composition according to an embodiment may be obtained by cross-linking the adhesive composition. In an implementation, cross-linking of the adhesive composition may be conducted after application of the adhesive composition. In another implementation, an adhesive layer formed of the cross-linked adhesive composition may be transferred to a substrate. The adhesive composition may be cross-linked at about 70 to about 140° C. for about 1 to about 5 minutes.

The adhesive layer prepared from the adhesive composition may exhibit practical adhesive performance (without an aging process) immediately after cross-linking (adhesive processing). The practical adhesive performance of the adhesive layer may be evaluated by comparing the gel fraction of the adhesive layer immediately after cross-linking (adhesive processing) with the gel fraction of the adhesive layer via storage at about 23° C. and about 50% RH for about 7 days after cross-linking (adhesive processing). For example, the gel fraction after storage for about 7 days may be within the gel fraction immediately after cross-linking (adhesive processing) ±5%, e.g., within the gel fraction immediately after cross-linking (adhesive processing) ±3%. Within this range, the adhesive composition may have considerably improved productivity. The gel fraction may be measured by a process described in the following examples.

Herein, with regard to the gel fraction, the expression "immediately after" in "immediately after cross-linking (adhesive processing)" may refer to "within about 10 minutes". For example, "the gel fraction in the adhesive layer immediately after cross-linking (adhesive processing)" may refer to the gel fraction measured within about 10 minutes after completion of adhesive processing (after drying (cross-linking) the adhesive layer at a predetermined temperature for a predetermine time). Similarly, the expression "immediately after preparation of an adhesive layer-attached polarizer plate" may refer to "within about 10 minutes after adhesive processing (after forming an adhesive layer by depositing a solution of an adhesive composition to form an adhesive composition layer, followed by drying (cross-linking) the adhesive composition layer at a predetermined temperature for a predetermine time", instead of a period of time for manufacturing a sample for measurement.

The adhesive composition may be used to bond various materials, e.g., glass, plastic films, paper, metal foil, or the like. The glass may include typical inorganic glass. Examples of plastics for the plastic films may include polyvinyl chloride resins, polyvinylidene chloride, cellulose resins, acrylic resins, cycloolefin resins, amorphous polyolefin resins, polyethylene, polypropylene, polystyrene, ABS resin, polyamide, polyester, polycarbonate, polyurethane, polyvinyl alcohol, ethylene-vinyl acetate copolymers, and chlorinated polypropylene. The amorphous polyolefin resins may include a polymer unit of a cyclic polyolefin, such as norbornene or multiple-ring norbornene monomers, and may be a copolymer of cyclic olefin and a chain-cyclic olefin. Examples of commercially available products of the amorphous polyolefin resins may include ATON™ (JSR Co., Ltd.), ZEONEX® and ZEONR® (Nihon Zeon Co., Ltd.), APO® and APEL® (Mitsui Chemicals Inc.), etc. The amorphous polyolefin resins may be formed into a film by a suitable method, such as solvent casting and melt extrusion. Examples of paper may include vellum paper, wood free paper, craft paper, art coat paper, caster coat paper, bowl paper, artificial parchment, waterproof paper, glassine paper, and linerboard. One example of metal foil may include aluminum foil.

Other embodiments provide optical members, surface protective films, and adhesive sheets, which include an adhesive layer prepared from the adhesive composition according to an embodiment.

Hereinafter, uses of the adhesive composition according to an embodiment will be illustrated in detail as follows, without being limited thereto.

<Optical Member>

The adhesive composition according to an embodiment may be applied directly to one or opposite sides of an optical member to form an adhesive layer. Alternatively, an adhesive layer (prepared in advance by depositing the adhesive composition on a release film) may be transferred to one or opposite sides of an optical member. For example, the embodiments provide an optical member including an adhesive layer prepared from the adhesive composition according to an embodiment.

Examples of the optical member may include a polarizer plate, a phase difference plate, an optical film for PDPs, a conductive film for touch panels, and the like. For example, the adhesive composition of an embodiment may exhibit excellent adhesion to a polarizer plate and glass. However, the embodiments are not limited thereto and the adhesive composition may also be used to bond other materials.

When the adhesive composition is used for an adhesive layer of an optical member, the component (A) in the composition may be prepared from a monomer mixture including (a1) about 0 to about 9 parts by weight of a carboxyl group containing monomer, (a2) about 0 to about 1.8 parts by weight of a hydroxyl group containing (meth)acrylic monomer, and (a3) about 89.2 to about 99.9 parts by weight of a (meth)acrylic acid ester monomer, and may have a weight average molecular weight of about 1,000,000 to about 2,000,000 g/mol.

Here, it should be noted that a total amount of the components (a1) and (a2) may be greater than 0 parts by weight. For example, the (meth)acrylic copolymer (A) may include at least one of a constituent or repeating unit derived from the component (a1) and a constituent or repeating unit derived from the component (a2). A total amount of the components (a1), (a2), and (a3) may about 100 parts by weight.

The amount of the component (a1) in the monomer mixture for preparing the component (A) for the optical member may be 0 (e.g., the component (a1) may not be present), or, if present, about 0.1 to about 9 parts by weight, e.g., about 0.2 to about 9 parts by weight. The amount of the component (a2) in the monomer mixture for preparing the component (A) for the optical member may be 0 (e.g., the component (a2) may not be present), or, if present, about 0.05 to about 1.8 parts by weight, e.g., about 0.1 to about 1.8 parts by weight. The amount of the component (a3) in the monomer mixture for preparing the component (A) for the optical member may be about 90 to about 99.9 parts by weight, e.g., about 91 to about 99.9 parts by weight.

A total amount of the components (a1) and (a2) in the monomer mixture for preparing the component (A) for the optical member may be about 0.05 to about 10 parts by weight, e.g., about 0.1 to about 9 parts by weight.

The component (A) for the optical member may have a weight average molecular weight of about 1,000,000 to about 1,800,000 g/mol, e.g., about 1,100,000 to about 1,700,000 g/mol.

The component (B) of the adhesive composition for the optical member may be present in an amount of about 0.15 to about 0.9 parts by weight, e.g., about 0.2 to about 0.8 parts by weight, based on 100 parts by weight of the component (A). The component (C) of the adhesive composition for the optical member may be present in an amount of about 0.05 to about 4 parts by weight, e.g., about 0.05 to about 3 parts by weight, based on 100 parts by weight of the component (A). Within this range, the adhesive composition for the optical member may have a long pot life to obtain excellent workability and may exhibit practical adhesive properties immediately after adhesive processing (cross-linking), thereby considerably improving productivity.

Further, if the isocyanate crosslinking agent is used as the component (D), the component (D) may be present in an amount of about 0.07 to about 3 parts by weight, e.g., about 0.1 to about 2 parts by weight, based on 100 parts by weight of the component (A).

Also, if the imidazole compound is used as the component (E), the component (E) may be present in an amount of about 0.007 to about 0.18 parts by weight, e.g., about 0.01 to about 0.1 parts by weight, based on 100 parts by weight of the component (A).

For the optical member, the adhesive composition may further include the silane coupling agent (F). Examples and amount of the silane coupling agent (F) are described above and thus are not repeated herein.

The adhesive composition for the optical member may be coated by any suitable method, e.g., using a natural coater, a knife belt coater, a floating knife, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. Although adjusted based on materials and purposes, a thickness of the coated adhesive composition for the optical member (thickness after drying) may be about 5 to about 35 μm, e.g., about 15 to about 30 μm.

When the adhesive composition is used for the optical member, the adhesive layer may have a gel fraction of about 50 to about 95%, e.g., about 60 to about 92% or about 70 to about 90%, at about 23° C. and about 50% RH immediately after adhesive processing (cross-linking). Within this range, the optical member having the adhesive layer may be quickly subjected to punching or slitting. In order to set the gel fraction within the above range, conditions may be properly selected, e.g., the compositions of the monomer mixture for preparing the component (A), or the amount of the component (B) or (C), may be adjusted as described above.

In the optical member, the adhesive layer on the optical member may have an adhesive strength of about 0.5 to about 9 (N/25 mm), e.g., about 1 to about 6 (N/25 mm). Within this range, favorable reworkability may be obtained. The adhesive strength may be measured according to a test method of pressure sensitive adhesive tapes and sheets disclosed in JIS Z0237 (2000), specifically by the process described in the following examples.

The adhesive composition used for the optical member may have a long pot life to obtain excellent workability and may exhibit practical adhesive properties immediately after cross-linking (adhesive processing), thereby considerably improving productivity. Further, the adhesive layer obtained from the adhesive composition for the optical member may have proper adhesive strength or adhesion to a substrate, excellent metal corrosion control and prevention properties, light leakage resistance, durability, adherend contamination resistance, low-temperature stability, and reworkability.

<Surface Protective Film>

The adhesive composition according to an embodiment may be suitably used for a surface protective film, e.g., for a surface protective film for an optical member. For example, the embodiments provide a surface protective film including an adhesive layer prepared from the adhesive composition according to an embodiment.

The protective film may include any suitable protective film, e.g., resin films, such as polyethylene terephthalate (PET), polyethylene, polypropylene, ethylene-vinyl acetate copolymers, polyester, polyvinyl chloride, polycarbonate, polyamide, and polystyrene films or composite films thereof. In an implementation, a polyethylene terephthalate film may be used. The protective film may have a thickness of about 15 to about 50 μm.

The adhesive layer may be formed on the protective film by applying the adhesive composition directly to the protective film, by transferring the adhesive composition deposited on a separate substrate (e.g., release liner), or the like.

The surface protective film may be used to protect an optical member coupled with a flat display panel, such as a LCD or a PDP. The optical member may include, e.g., a polarizer plate, a phase difference plate, a brightness enhancement plate, a glare shielding sheet, or the like. In an implementation, the optical member may be a laminate of at least two optical elements, e.g., a laminate of a polarizer plate and a phase difference plate, a laminate of phase difference plates, a laminate of a polarizer plate and a brightness enhancement plate or a glare shield sheet, etc. The surface protective film may be used not only as an independent optical member for distribution but also as an optical member coupled to a flat display panel for distribution.

When the adhesive composition is used for an adhesive layer of a surface protective film, the component (A) of the composition may be prepared from a monomer mixture including (a1) about 0 to about 0.5 parts by weight of the carboxyl group containing monomer, (a2) about 0.6 to about 9 parts by weight of the hydroxyl group containing (meth)acrylic monomer, and (a3) about 90.5 to about 99.4 parts by weight of the (meth)acrylic acid ester monomer, and may have a weight average molecular weight of about 100,000 to about 1,000,000 g/mol. A total amount of the components (a1), (a2) and (a3) may be about 100 parts by weight.

The amount of the component (a1) in the monomer mixture for preparing the component (A) for the surface protective film may be 0 (e.g., the component (a1) may not be present), or, if present, about 0.1 to about 0.5 parts by weight. The amount of the component (a2) in the monomer mixture for preparing the component (A) for the surface protective film may be about 0.7 to about 9 parts by weight, e.g., about 1 to about 9 parts by weight. The amount of the component (a3) in the monomer mixture for preparing the component (A) for the surface protective film may be about 90.6 to about 99.3 parts by weight.

A total amount of the components (a1) and (a2) in the monomer mixture for preparing the component (A) for the surface protective film may be about 0.7 to about 9.4 parts by weight, e.g., about 0.8 to about 9.3 parts by weight.

The component (A) for the surface protective film may have a weight average molecular weight of about 150,000 to about 900,000 g/mol, e.g., about 200,000 to 850,000 g/mol.

The component (B) of the adhesive composition for the surface protective film may be included in an amount of about 0.15 to about 0.9 parts by weight, e.g., about 0.2 to about 0.8 parts by weight, based on 100 parts by weight of the component (A). The component (C) of the adhesive composition for the surface protective film may be included in an amount of about 0.1 to about 5 parts by weight, based on 100 parts by weight of the component (A). Within this range, the adhesive composition for the surface protective film may have a long pot life to obtain excellent workability and may exhibit practical adhesive properties immediately after cross-linking (adhesive processing), thereby considerably improving productivity.

Further, if the isocyanate crosslinking agent is used as the component (D), the component (D) may be present in an amount of about 0.07 to about 3 parts by weight, e.g., about 0.1 to about 2.5 parts by weight, based on 100 parts by weight of the component (A).

Also, if the imidazole compound is used as the component (E), the component (E) may be present in an amount of about 0.007 to about 0.18 parts by weight, e.g., about 0.01 to about 0.1 parts by weight, based on 100 parts by weight of the component (A).

For the surface protective film, the adhesive composition may not include the silane coupling agent (F).

The adhesive composition for the surface protective film may be coated by any suitable method, e.g., using a natural coater, a knife belt coater, a floating knife, roll coating, air-knife coating, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. In particular, roll coating, gravure coating, reverse coating, roll brushing, spraying, air-knife coating, and die coating. Although adjusted based on materials and purposes, a thickness of the coated adhesive composition on the surface protective film (thickness of the adhesive layer: thickness after drying) may be about 3 to about 200 μm, e.g., about 10 to about 100 μm or about 15 to about 50 μm.

When the adhesive composition is used for the surface protective film, the adhesive layer may have a gel fraction of about 70 to about 100%, e.g., about 80 to about 99% or about 85 to about 98%, at about 23° C. and about 50% RH immediately after cross-linking (adhesive processing). Within this range, the surface protective film having the adhesive layer may be quickly subjected to punching or slitting. In order to set the gel fraction within the above range, conditions may be properly selected, e.g., the compositions of the monomers in the monomer mixture for preparing the component (A), or the amount of the component (B) or (C), may be adjusted as described above.

In the surface protective film, the adhesive layer on the surface protective film may have an adhesive strength of about 0.05 to about 0.30 (N/25 mm), e.g., about 0.09 to about 0.20 (N/25 mm). Within this range, favorable adherend contamination resistance may be obtained.

The adhesive composition used to prepare the surface protective film may have a long pot life to obtain excellent workability and may exhibit practical adhesive properties immediately after cross-linking (adhesive processing), thereby considerably improving productivity. Further, the adhesive layer obtained from the adhesive composition may have proper adhesive strength or adhesion to a substrate, excellent metal corrosion control and prevention properties, adherend contamination resistance, low-temperature stability, and transparency and control/prevent foaming under high-temperature and high-humidity conditions (as in autoclaving).

<Adhesive Sheet>

The adhesive composition according to an embodiment may be formed into an adhesive layer through application to a substrate or separator and drying (crosslinking), thereby preparing an adhesive sheet in a sheet or tape shape. For example, the embodiments provide an adhesive sheet including an adhesive layer prepared from the adhesive composition according to an embodiment.

Examples of the substrate for the adhesive sheet may include plastic films, such as a polyester film including a polyethylene terephthalate (PET) film, a polypropylene film, and a cellophane film, plastics, such as polyurethane and an ethylene-propylene terpolymer (EPT), or various thin materials known in the art, such as rubber foam, paper, and aluminum foil. These substrates may be subjected to surface treatment, such as corona treatment, plasma treatment, and formation of an easy bonding layer, or may have an antistatic layer on the surface depending on materials. Examples of the separator may include the plastic films used for the substrate, which may be surface-treated with silicon, fluorine, and long-chain alkyl peel-treating agents, or a polypropylene film which is not surface-treated.

When the adhesive layer is formed on a substrate, the adhesive layer may be formed on one surface of the substrate to prepare a one-sided adhesive sheet or may be formed on each of both surfaces to prepare a double-sided adhesive sheet. In the double-sided adhesive sheet, the adhesive composition according to an embodiment may be formed on one surface of the substrate only (e.g., and a different adhesive composition may be formed on another surface of the substrate), thereby preparing a tape having different adhesives on opposite sides. When the adhesive layer is formed on a separator, a double-sided adhesive sheet may be prepared.

When the adhesive composition is used for an adhesive layer of an adhesive sheet, the component (A) included in the composition may be prepared from a monomer mixture including (a1) about 0 to about 9 parts by weight of the carboxyl group containing monomer, (a2) about 0 to about 9 parts by weight of the hydroxyl group containing (meth) acrylic monomer, and (a3) about 82 to about 99.9 parts by weight of the (meth)acrylic acid ester monomer, and may have a weight average molecular weight of about 100,000 to about 1,000,000 g/mol.

Here, it should be noted that a total amount of the components (a1) and (a2) may be greater than 0 parts by weight. For example, the (meth)acrylic copolymer (A) may include at least one of a constituent or repeating unit derived from the component (a1) and a constituent or repeating unit derived from the component (a2). A total amount of the components (a1), (a2), and (a3) may be about 100 parts by weight.

The amount of the component (a1) in the monomer mixture for preparing the component (A) for the adhesive sheet may be 0 (e.g., the component (a1) may not be present), or, if present, about 0.1 to about 8 parts by weight, e.g., about 0.15 to about 7.5 parts by weight. The amount of the component (a2) in the monomer mixture for preparing the component (A) for the adhesive sheet may be 0 (e.g., the component (a2) may not be present), or, if present, about 0.1 to about 9 parts by weight. The amount of the component (a3) in the monomer mixture for preparing the component (A) for the adhesive sheet may be about 90.6 to about 99.3 parts by weight.

A total amount of the components (a1) and (a2) in the monomer mixture for preparing the component (A) for the adhesive sheet may be about 0.7 to about 9.4 parts by weight, e.g., about 0.8 to about 9.3 parts by weight.

The component (A) for the adhesive sheet may have a weight average molecular weight of about 150,000 to about 950,000 g/mol, e.g., about 200,000 to 900,000 g/mol.

The component (B) of the adhesive composition for the adhesive sheet may be present in an amount of about 0.15 to about 0.9 parts by weight, e.g., about 0.2 to about 0.8 parts by weight, based on 100 parts by weight of the component (A). The component (C) of the adhesive composition for the adhesive sheet may be present in an amount of about 0.06 to about 4 parts by weight, e.g., about 0.1 to about 3 parts by weight, based on 100 parts by weight of the component (A). Within this range, the adhesive composition for the adhesive sheet may have a long pot life to obtain excellent workability and may exhibit practical adhesive properties immediately after cross-linking, thereby considerably improving productivity.

Further, if the isocyanate crosslinking agent is used as the component (D), the component (D) may be present in an amount of about 0.07 to about 3 parts by weight, e.g., about 0.1 to about 2 parts by weight, based on 100 parts by weight of the component (A).

Also, if the imidazole compound is used as the component (E), the component (E) may be present in an amount of about 0.007 to about 0.18 parts by weight, e.g., about 0.01 to about 0.12 parts by weight, based on 100 parts by weight of the component (A).

For the adhesive sheet, the adhesive composition may not include the silane coupling agent (F).

The adhesive composition for the adhesive sheet may be coated by any suitable method, e.g., using a natural coater, a knife belt coater, a floating knife, roll coating, air-knife coating, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. In an implementation, roll coating, gravure coating, reverse coating, roll brushing, spraying, air-knife coating, and die coating. Although adjusted based on materials and purposes, a thickness of the coated adhesive composition formed on the adhesive sheet (thickness of the adhesive layer: thickness after drying) may be about 3 to about 200 μm, e.g., about 5 to about 100 μm.

When the adhesive composition is used for the adhesive sheet, the adhesive layer may have a gel fraction of about 70 to about 100%, e.g., about 80 to about 99% or about 85 to 98%, at about 23° C. and about 50% RH immediately after cross-linking (adhesive processing). Within this range, the adhesive sheet having the adhesive layer may be quickly subjected to punching or slitting. In order to set the gel fraction within the above range, conditions may be properly selected, e.g., the compositions of the monomers in the monomer mixture for preparing the component (A) or the amount of the component (B) or (C) may be adjusted as described above.

In the adhesive sheet, the adhesive layer formed in the adhesive sheet may have an adhesive strength of about 0.05 to about 20 (N/25 mm), e.g., about 0.1 to about 15 (N/25 mm). Within this range, the adhesive sheet may be coated to various adhesive sheets in a sheet or tape shape in which adhesive strength is desired.

The adhesive composition used for the adhesive sheet may have a long pot life to obtain excellent workability and may exhibit practical adhesive properties (e.g., proper gel fraction) immediately after cross-linking (adhesive processing), thereby considerably improving productivity. Further, the adhesive layer obtained from the adhesive composition may have proper adhesive strength or adhesion to a substrate, excellent metal corrosion control and prevention properties, adherend contamination resistance, low-temperature stability, transparency, heat resistance, and humidity/heat resistance.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

In the following examples, solid content and viscosity of the polymer solutions, viscosity of the adhesive compositions, and weight average molecular weight of the polymers (A) were measured by the following process.

<Solid Content>

About 1 g of a polymer solution was precisely measured on a precisely weighed glass plate. The solution was dried at 105° C. for 1 hour and cooled to room temperature and then the total mass of the glass plate and the remaining solid content was precisely measured. Defining the mass of the glass plate as X, the total mass of the glass plate and the polymer solution before drying as Y, and the total mass of the glass plate and the remaining solid content as Z, a solid content was calculated by Equation 1:

Solid content (%)={(Z−X)/(Y−X)}×100    [Equation 1]

<Viscosity>

The temperature of a polymer solution or an adhesive composition in a glass bottle was adjusted to about 25° C. and then viscosity was measured using a B-type viscometer. The viscosity of the adhesive composition was measured twice, immediately after preparation of the adhesive composition and 12 hours after preparation.

<Weight Average Molecular Weight>

The weight average molecular weight was measured by the following method under the following conditions illustrated in Table 1.

TABLE 1

| Equipment: | Gel Permeation Chromatography (GPC, Device No. GPC-16) |
|---|---|
| Detector: | Differential Refractive Index Detector (RI-8020, Sensitivity: 32, Tosoh Corporation) |
| | UV Absorbance Detector (Model 2487, Wavelength: 215 nm, Sensitivity: 0.2 AUFS, Waters Co., Ltd.)) |
| Column: | Two TSKgel GMHXL, One G2500HXL (S/N M0052, M0051, N0010, φ7.8 mm × 30 cm, Tosoh Corporation) |
| Solvent: | Tetrahydrofuran (Wako Junyaku Co., Ltd.) |
| Flow rate: | 1.0 ml/min |
| Column temperature: | 23° C. |
| Sample: | Concentration: About 0.2% |
| | Dissolving: Smoothly stirred at room temperature |
| | Solubility: Dissolved (identified with the naked eye) |
| | Filtration: Filtered through a 0.45 μm filter |
| | Input amount: 0.200 ml |
| | Reference sample: Monodispersed polystyrene |
| Data processing: | GPC data processing system |

Preparation Example 1

99 parts by weight of n-butyl acrylate (Nihon Shokubai, Co., Ltd.), 1 part by weight of 2-hydroxyethyl acrylate (Nihon Shokubai, Co., Ltd.), and 120 parts by weight of ethyl acetate were placed in a flask equipped with a reflux condenser and an agitator, and were heated to 65° C. under a nitrogen atmosphere. 0.04 parts by weight of azobisisobutyronitrile (AIBN) was added, followed by polymerization for 6 hours while maintaining the mixture at 65° C. After completing polymerization, the mixture was diluted with 280 parts by weight of ethyl acetate, thereby obtaining a solution of a polymer (A-1). The solution of the polymer (A-1) had a solid content of 20% and a viscosity of 4,500 mPa·s. The polymer (A-1) had a weight average molecular weight of 1,600,000 g/mol.

Preparation Examples 2 to 19

Solutions of polymers (A-2) to (A-19) were prepared by the same process as in Preparation Example 1 except that the monomers were mixed according to the compositions listed in Table 2 of FIG. 1. Then, the solid contents and the viscosities of the solutions of the polymers (A-2) to (A-19) and the weight average molecular weights of the polymers (A-2) to (A-19) were measured, and results are shown in Table 2. In Table 2, "BA," "MA," "HEA," "4HBA," "HEAA," and "AA" refer to butyl acrylate, methyl acrylate, 2-hydroxyethyl acrylate, 4-hydroxybutyl acrylate, N-2-hydroxyethyl acrylamide, and acrylic acid, respectively.

Example 1

500 parts by weight of the solution of the polymer (A-1) (100 parts by weight in terms of solid content) obtained in Preparation example 1, 0.2 parts by weight of benzoyl peroxide (B-1, Sigma Aldrich Japan Co., Ltd.) as a peroxide crosslinking agent (B), 1 part by weight of CARBODILITE® V-01 (C-1, Nisshinbo Chemical Inc.) as a carbodiimide crosslinking agent (C), 0.1 parts by weight of Colonate L® (D-1, trimethylolpropane/tolylene diisocyanate trimer adduct, Nippon Polyurethane Industry Co., Ltd.) as an isocyanate crosslinking agent (D), 0.01 parts by weight of 1-methylimidazole (E-1, Tokyo Kasei Kogyo Co., Ltd.) as an imidazole compound (E), and 0.1 parts by weight of X-41-1810 (F-1, Shin-Etsu Chemical Co., Ltd.) as a silane coupling agent were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 130° C. for 3 minutes, thereby forming an adhesive layer. Then, the adhesive layer was attached to a polarizer plate, thereby producing an adhesive layer-attached polarizer plate.

Examples 2 to 10 and Comparative Examples 1 to 9

Adhesive composition solutions and adhesive layer-attached polarizer plates were prepared in the same process as in Example 1 except that the polymers obtained in Preparation Examples 2 to 19, peroxide crosslinking agents, carbodiimide crosslinking agents, isocyanate crosslinking agents, imidazole compounds, silane coupling agents, and additional crosslinking agents were used according to the compositions listed in Tables 4 and 5 of FIGS. 2 and 3, respectively. Details of peroxide crosslinking agents B-1 and B-2, carbodiimide cross-linkers C-1, C-2 and C-3, imidazole compounds E-1, E-2, E-3 and E-4, silane coupling agents F-1, F-2, F-3 and F-4, and an additional crosslinking agent G-1 are shown in Table 3.

TABLE 3

| Peroxide crosslinking agent (B) | B-1: benzoyl peroxide (Sigma Aldrich Japan Co., Ltd.) |
| | B-2: di(4-t-butylcyclohexyl)peroxide dicarbonate (Sigma Aldrich Japan Co., Ltd.) |
| Carbodiimide crosslinking agent (C) | C-1: CARBODILITE ® V-01 (Nisshinbo Chemical Inc) |
| | C-2: CARBODILITE ® V-05 (Nisshinbo Chemical Inc) |
| | C-3: CARBODILITE ® V-09 (Nisshinbo Chemical Inc) |
| Isocyanate crosslinking agent (D) | D-1: Colonate L ® (trimethylolpropane/tolylene diisocyanate trimer adduct, Nippon Polyurethane Industry Co., Ltd.) |
| Imidazole compound (E) | E-1: 1-methylimidazole (Tokyo Kasei Kogyo Co., Ltd.) |
| | E-2: 1-butylimidazole (Tokyo Kasei Kogyo Co., Ltd.) |
| | E-3: 1,2-dimethylimidazole (Tokyo Kasei Kogyo Co., Ltd.) |
| | E-4: 2-ethyl-4-methylimidazole (Tokyo Kasei Kogyo Co., Ltd.) |
| Silane coupling | F-1: Shin-etsu silicone X41-1810 (Shin-etsu Chemical Co., Ltd.) |

TABLE 3-continued

| agent (F) | F-2: 3-glycidoxypropylmethyldiethoxysilane (KBM-403, Shin-etsu Chemical Co., Ltd.) F-3: Compound represented by Formula 3: |
|---|---|

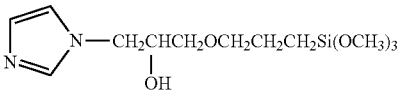

[Formula 3]

F-4: Compound represented by Formula 4:

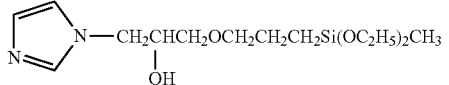

[Formula 4]

| Additional crosslinking agent (G) | G-1: 1,3-bis(N,N-diglycidylaminomethyl)cyclohexane (TETRAD C, Mitsubishi Gas Chemical Company, Inc.) |
|---|---|

Physical properties of the adhesive layer-attached polarizer plates obtained according to Examples 1 to 10 and Comparative Examples 1 to 9 were evaluated as follows.

1. Metal Corrosion Control and Prevention Properties

Immediately after preparation of each adhesive layer-attached polarizer plate (by attaching an adhesive layer to a polarizer plate within 10 minutes after forming the adhesive layer by drying (cross-linking) an adhesive composition solution-applied layer at 130° C. for 3 minutes), the adhesive layer of each adhesive layer-attached polarizer plate was attached to an aluminum foil and left at 60° C. and 90% RH for 2 days, followed by observation of corrosion. In Tables 4 and 5, no change is indicated by "O" and whitening (indicating corrosion) is indicated by "X."

2. Light Leakage Resistance

Immediately after preparation of each adhesive layer-attached polarizer plate (by attaching an adhesive layer to a polarizer plate within 10 minutes after forming the adhesive layer by drying (cross-linking) an adhesive composition solution-applied layer at 130° C. for 3 minutes), the polarizer plate was cut into a 120 mm (MD direction of the polarizer plate)× 60 mm piece and a 120 mm (TD direction of the polarizer plate)×60 mm piece. The respective pieces were attached to opposite sides of a glass substrate to overlap each other and subjected to autoclaving at 50° C. and 0.49 MPa (5 kg/cm$^2$) for 20 minutes. Then, the glass substrate was left at 80° C. for 120 hours and 500 hours, followed by observation of appearance. In Tables 4 and 5, no light leakage after 120 hours and 500 hours is indicated by "⊚," no light leakage after 120 hours is indicated by "O," and light leakage after 120 hours is indicated by "X."

3. Durability

Immediately after preparation of each adhesive layer-attached polarizer plate (by attaching an adhesive layer to a polarizer plate within 10 minutes after forming the adhesive layer by drying (cross-linking) an adhesive composition solution-applied layer at 130° C. for 3 minutes), the polarizer plate was cut into a 120 mm (MD direction of the polarizer plate)× 60 mm piece. Each piece was attached to a glass substrate and subjected to autoclaving at 50° C. and 0.49 MPa (5 kg/cm$^2$) for 20 minutes. Then, the glass substrate was left at 100° C. and at 80° C. and 90% RH for 120 hours, followed by observation of appearance. In Tables 4 and 5, no occurrence of bubbles, damage, or peeling is indicated by "O," while occurrence of bubbles, damage, or peeling is indicated by "X."

4. Adhesive Strength

Immediately after preparation of each adhesive layer-attached polarizer plate (by attaching an adhesive layer to a polarizer plate within 10 minutes after forming the adhesive layer by drying (cross-linking) an adhesive composition solution-applied layer at 130° C. for 3 minutes), the polarizer plate was cut into a 25 mm wide piece. The piece was attached to a glass substrate and subjected to autoclaving at 50° C. and 0.49 MPa (5 kg/cm$^2$) for 20 minutes. The adhesive strength of the adhesive layer was measured according to a test method of pressure sensitive adhesive tapes and sheets disclosed in JIS Z0237 (2000), using a tensile tester at a stripping angle of 90° and a stripping rate of 0.3 m/min under 23° C./50% RH conditions.

5. Adhesion to Substrate

While measuring adhesive strength, adhesion was evaluated. In Tables 4 and 5, the adhesive layer not being separated from the substrate is indicated by "O," while the adhesive layer being separated from the substrate is indicated by "X."

6. Adherend Contamination Resistance

The contact angle of the glass substrate was measured before and after measurement of the adhesive strength. The contact angle was measured according to a test method of wettability of a glass substrate disclosed in JIS R3257 (1999). In Tables 4 and 5, when a change in the contact angle of the glass substrate before and after measurement of the adhesive strength was 3° or less, it is indicated by "O," and when a change in the contact angle of the glass substrate before and after measurement of the adhesive strength was more than 3°, it is indicated by "X."

7. Low-Temperature Stability

Immediately after preparation of each adhesive layer-attached polarizer plate (by attaching an adhesive layer to a polarizer plate within 10 minutes after forming the adhesive layer by drying (cross-linking) an adhesive composition solution-applied layer at 130° C. for 3 minutes), the polarizer plate was cut into a 120 mm (MD direction of the polarizer plate)× 60 mm piece. The piece was attached to a glass substrate and subjected to autoclaving at 50° C. and 0.49 MPa (5 kg/cm$^2$) for 20 minutes. Then, the glass substrate was left at −40° C. for 120 hours, followed by observation of appearance. In Tables 4 and 5, no occurrence of bubbles, separation, peeling, or recrystallized materials is indicated by "O," while occurrence of bubbles, separation, peeling, or recrystallized materials is indicated by "X."

8. Reworkability

While measuring adhesive strength, a separated state was observed. In Tables 4 and 5, appearance of interface failure is indicated by "O," and appearance of adhesion and/or cohesion failure of the adhesive to the glass substrate (adherend) is indicated by "X."

9. Gel Fraction

Instead of the adhesive layer-attached polarizer plates according to Examples 1 to 10 and Comparative examples 1 to 9, a solution of each adhesive composition was applied to a stripped polyester film to a dry thickness of 25 μm and subjected to drying (cross-linking) at 130° C. for 3 minutes to form an adhesive layer on the stripped polyester film, followed by measurement of gel fraction within 10 minutes (that is, immediately after preparation of the adhesive layer-attached polyester film) and after storage for 7 days under 23° C./50% RH conditions. That is, about 0.1 g of each adhesive composition, immediately after preparation of the adhesive layer-attached polyester film and left for 7 days under 23° C./50% RH conditions, was weighed and defined as $W_1(g)$.

This composition was placed in a sample bottle, and about 30 g of ethyl acetate was added thereto and left for 24 hours. After a predetermined period of time, the contents of the bottle were filtered through a 200-mesh stainless steel mesh (weight: $W_2(g)$). The mesh and the remaining materials were dried at 90° C. for 1 hour, and the total weight $W_3(g)$ was measured. The gel fraction was calculated using the measured values by Equation 2:

$$\text{Gel fraction (\%)} = \{(W_3 - W_2)/W_1\} \times 100. \quad \text{[Equation 2]}$$

Evaluation results are listed in Tables 4 and 5. Further, in Tables 4 and 5, the viscosity of an adhesive composition "immediately after preparation" refers to the viscosity of the adhesive composition measured within 10 minutes after completion of formulation of the adhesive composition (after mixing the respective components for a predetermined period of time). Similarly, in Tables 4 and 5, the gel fraction of an adhesive composition "immediately after preparation" refers to the gel fraction of the adhesive composition measured with respect to a sample immediately (within 10 minutes) after preparation of the adhesive layer-attached polyester film instead of the adhesive layer-attached polarizer plate.

Further, in measurement of the gel fraction with respect to the adhesive layer-attached polarizer plate of Comparative Example 3, the adhesive layer-attached polarizer plate was left for 0.5 days under 23° C./50% RH conditions, followed by measurement of the gel fraction according to the aforementioned measurement method. In this case, the gel fraction of the adhesive composition was 63%.

As shown in Tables 4 and 5, the adhesive compositions according to Examples 1 to 10 exhibited excellent pot life and allowed the adhesive layers to be cross-linked (cured) in a very short period of time (within 10 minutes) after crosslinking, as compared with the adhesive compositions according to Comparative Examples 1 to 9. Accordingly, the adhesive compositions according to the embodiments are considered to remarkably help improve workability and productivity. Moreover, the polarizer plates using the adhesive compositions according to Examples 1 to 10 exhibited excellent light leakage resistance, durability, adhesion to substrate, adherend contamination resistance, low-temperature stability, and reworkability, as compared with the polarizer plates of Comparative Examples 1 to 9.

Preparation Example 20

40 parts by weight of n-butyl acrylate (Nihon Shokubai, Co., Ltd.), 59 parts by weight of 2-ethylhexyl acrylate, 1 part by weight of 2-hydroxyethyl acrylate, and 150 parts by weight of ethyl acetate were placed in a flask equipped with a reflux condenser and an agitator, and were heated to 65° C. under a nitrogen atmosphere. 0.1 parts by weight of azobisisobutyronitrile (AIBN) was added, and 0.05 parts by weight of AIBN was further added after 1 hour, followed by polymerization for 6 hours while maintaining the mixture at 65° C. After completing polymerization, the mixture was diluted with 36 parts by weight of ethyl acetate and cooled to room temperature, thereby obtaining a solution of a polymer (A-20). The solution of the polymer (A-20) had a solid content of 35% and a viscosity of 3,500 mPa·s. The polymer (A-20) had a weight average molecular weight of 800,000 g/mol.

Preparation Examples 21 to 38

Solutions of polymers (A-21) to (A-38) were prepared by the same process as in Preparation Example 20 except that the monomers were mixed according to the compositions listed in Table 6 of FIG. 4. Then, the solid contents and the viscosities of the solutions of the polymers (A-21) to (A-38) and the weight average molecular weights of the polymers (A-21) to (A-38) were measured, and results are shown in Table 6. In Table 6, "BA," "2EHA," "HEA," "4HBA," "HEAA," "AA," and "AM" refer to butyl acrylate, 2-ethylhexyl acrylate, 2-hydroxyethyl acrylate, 4-hydroxybutyl acrylate, N-2-hydroxyethyl acrylamide, acrylic acid, and acylamide, respectively.

Example 11

286 parts by weight of the solution of the polymer (A-20) (100 parts by weight in terms of solid content) obtained in Preparation example 20, 0.2 parts by weight of benzoyl peroxide (B-1, Sigma Aldrich Japan Co., Ltd.) as a peroxide crosslinking agent (B), 0.5 parts by weight of CARBODIL-ITE® V-01 (B-1, Nisshinbo Chemical Inc.) as a carbodiimide crosslinking agent (C), 0.5 parts by weight of Duranate™ 24A-100 (D-2, hexamethylene diisocyanate•biuret, Asahi Kasei Corporation) as an isocyanate crosslinking agent (D), and 0.01 parts by weight of 1-methylimidazole (E-1, Tokyo Kasei Kogyo Co., Ltd.) as an imidazole compound (E) were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 130° C. for 3 minutes, thereby forming an adhesive layer. Then, the adhesive layer was attached to a PET film (Lumirror® S10#25, Thickness: 23 μm, Toray Industries, Inc.), thereby producing a surface protective film (1).

Examples 12 to 20 and Comparative Examples 10 to 18

Adhesive composition solutions and surface protective films were prepared in the same process as in Example 11 except that the polymers obtained in Preparation Examples 21 to 38, carbodiimide crosslinking agents, imidazole compounds, isocyanate crosslinking agents, and other additives were used according to the compositions listed in Tables 8 and 9 of FIGS. 5 and 6, respectively. As a result, surface protective films (2) to (10) and comparative surface protective films (1) to (10) were obtained. Details of peroxide crosslinking agents B-1 and B-2, carbodiimide cross-linkers C-1 and C-3, isocyanate crosslinking agents D2 and D3, imidazole compounds E-1, E-2, E-3, and E-4, and other additives H-1, H2 and H-3 are shown in Table 7.

TABLE 7

| | |
|---|---|
| Peroxide crosslinking agent (B) | B-1: benzoyl peroxide (Sigma Aldrich Japan Co., Ltd.) |
| | B-2: di(4-t-butylcyclohexyl)peroxide dicarbonate (Sigma Aldrich Japan Co., Ltd.) |
| Carbodiimide crosslinking agent (C) | C-1: CARBODILITE ® V-01 (Nisshinbo Chemical Inc) |
| | C-3: CARBODILITE ® V-09 (Nisshinbo Chemical Inc) |
| Isocyanate crosslinking agent (D) | D-2: Hexamethylene diisocyanate•biuret (Duranate ™ 24A-100, Asahi Kasei Corporation) |
| | D-3: Hexamethylene diisocyanate•isocyanurate (Duranate ™ TPA-100, Asahi Kasei Corporation) |
| Imidazole compound (E) | E-1: 1-methylimidazole (Tokyo Kasei Kogyo Co., Ltd.) |
| | E-2: 1-butylimidazole (Tokyo Kasei Kogyo Co., Ltd.) |
| | E-3: 1,2-dimethylimidazole (Tokyo Kasei Kogyo Co., Ltd.) |
| | E-4: 2-ethyl-4-methylimidazole (Tokyo Kasei Kogyo Co., Ltd.) |

TABLE 7-continued

| Other additives (H) | H-1: Aluminium tris(acetylacetonate) (Alumichelate A, Kawaken Fine Chemicals Co., Ltd.) H-2: Dibutyltin dilaurate (Tokyo Kasei Kogyo Co., Ltd.) H-3: Acetylacetone (Tokyo Kasei Kogyo Co., Ltd.) |
|---|---|

Physical properties of the surface protective films obtained according to Examples 11 to 20 and Comparative Examples 10 to 18 were evaluated as follows.

1. Metal Corrosion Control and Prevention Properties

Immediately after preparation of each adhesive layer-attached surface protective film (in each example, within 10 minutes after forming an adhesive layer on a surface protective film by drying (cross-linking) an adhesive composition solution-applied layer at 130° C. for 3 minutes), the adhesive layer of the surface protective film was attached to an aluminum foil and left at 60° C. and 90% RH for 2 days, followed by observation of corrosion. In Tables 8 and 9, no change is indicated by "O" and whitening (indicating corrosion) is indicated by "X."

2. Autoclaving Suitability

Immediately after preparation of each adhesive layer-attached surface protective film (in each example, within 10 minutes after forming an adhesive layer on a surface protective film by drying (cross-linking) an adhesive composition solution-applied layer at 130° C. for 3 minutes), the surface protective film was cut into a 25 mm wide piece. The piece was attached to a polarizer plate and subjected to autoclaving at 50° C. and 0.49 MPa (5 kg/cm$^2$) for 20 minutes, followed by observation of bubbles. In Tables 8 and 9, no occurrence of bubbles is indicated by "O," while occurrence of bubbles is indicated by "X".

3. Adhesive Strength

Immediately after preparation of each adhesive layer-attached surface protective film (in each example, within 10 minutes after forming an adhesive layer on a surface protective film by drying (cross-linking) an adhesive composition solution-applied layer at 130° C. for 3 minutes), the surface protective film was cut into a 25 mm wide piece. The piece was attached to a polarizer plate and subjected to autoclaving at 50° C. and 0.49 MPa (5 kg/cm$^2$) for 20 minutes. The adhesive strength of the adhesive layer was measured according to a test method of pressure sensitive adhesive tapes and sheets disclosed in JIS Z0237 (2000), using a tensile tester at a stripping angle of 180° and a stripping rate of 0.3 m/min under 23° C./50% RH conditions.

4. Adhesion to Substrate

While measuring the adhesive strength, the adhesion to each protective film (substrate) was evaluated. In Tables 8 and 9, the adhesive layer not being separated from the substrate is indicated by "O," while the adhesive layer being separated from the substrate is indicated by "X."

5. Adherend Contamination Resistance

A contact angle of the polarizer plate was measured before and after measurement of the adhesive strength. The contact angle was measured according to a test method of wettability of glass substrates disclosed in JIS R3257 (1999). In Tables 8 and 9, when a change in the contact angle of the polarizer plate before and after measurement of the adhesive strength was 3° or less, it is indicated by "O," and when a change in the contact angle of the polarizer plate before and after measurement of the adhesive strength was more than 3°, it is indicated by "X."

6. Low-Temperature Stability

Immediately after preparation of each adhesive layer-attached surface protective film (in each example, within 10 minutes after forming an adhesive layer on a surface protective film by drying (cross-linking) an adhesive composition solution-applied layer at 130° C. for 3 minutes), the surface protective film was attached to a polarizer plate and subjected to autoclaving at 50° C. and 0.49 MPa (5 kg/cm$^2$) for 20 minutes. Then, the polarizer plate was left at −40° C. for 120 hours, followed by observation of appearance. In Tables 8 and 9, no occurrence of bubbles, separation, peeling, or recrystallized materials is indicated by "O," while occurrence of bubbles, separation, peeling, or recrystallized materials is indicated by "X."

7. Transparency of Adhesive Layer

Immediately after preparation of each adhesive layer-attached surface protective film (in each example, within 10 minutes after forming an adhesive layer on a surface protective film by drying (cross-linking) an adhesive composition solution-applied layer at 130° C. for 3 minutes), the adhesive layer of the surface protective film was observed with the naked eye to identify transparency of the adhesive film. In Tables 8 and 9, proper transparency is indicated by "O" and white turbidity of the adhesive layer is indicated by "X."

8. Gel Fraction

Instead of the adhesive layer-attached PET films according to Examples 11 to 20 and Comparative examples 10 to 18, a solution of each adhesive composition was applied to a stripped polyester film to a dry thickness of 25 μm and subjected to drying (cross-linking) at 130° C. for 3 minutes to form an adhesive layer on the stripped polyester film, followed by measurement of gel fraction within 10 minutes (that is, immediately after preparation of the adhesive layer-attached polyester film) and after storage for 7 days under 23° C./50% RH conditions. That is, about 0.1 g of each adhesive composition, immediately after preparation of the adhesive layer-attached polyester film and left for 7 days under 23° C./50% RH conditions, was weighed and defined as $W_1(g)$. This composition was placed in a sample bottle, and about 30 g of ethyl acetate was added thereto and left for 24 hours. After a predetermined period of time, the contents of the bottle were filtered through a 200-mesh stainless steel mesh (weight: $W_2(g)$). The mesh and the remaining materials were dried at 90° C. for 1 hour, and a total weight $W_3(g)$ was measured. The gel fraction was calculated using the measured values by Equation 2:

$$\text{Gel fraction (\%)} = \{(W_3 - W_2)/W_1\} \times 100. \quad \text{[Equation 2]}$$

Evaluation results are listed in Tables 8 and 9 of FIGS. 5 and 6, respectively. Further, in Tables 8 and 9, the viscosity of an adhesive composition "immediately after preparation" refers to the viscosity of the adhesive composition measured within 10 minutes after completion of formulation of the adhesive composition (after mixing the respective components for a predetermined period of time). Similarly, in Tables 8 and 9, the gel fraction of an adhesive composition "immediately after preparation" refers to the gel fraction of the adhesive composition measured with respect to a sample immediately (within 10 minutes) after preparation of the adhesive layer-attached polyester film instead of the adhesive layer-attached polarizer plate.

As shown in Tables 8 and 9, the adhesive compositions according to Examples 11 to 20 exhibited excellent pot life and allowed the adhesive layers to be cross-linked (cured) in a very short period of time (within 10 minutes) after cross-linking, as compared with the adhesive compositions according to Comparative Examples 10 to 18. Accordingly, the adhesive compositions according to the embodiments are considered to remarkably help improve workability and productivity. Moreover, the surface protective films according to Examples 11 to 20 exhibited excellent adhesion to substrate, adherend contamination resistance, low-temperature stability, transparency of the adhesive layers, and autoclaving suitability, as compared with the polarizer plates Comparative Examples 10 to 18.

Preparation Example 39

40 parts by weight of n-butyl acrylate (Nihon Shokubai, Co., Ltd.), 59 parts by weight of 2-ethylhexyl acrylate, 1 part by weight of 2-hydroxyethyl acrylate, and 150 parts by weight of ethyl acetate were placed in a flask equipped with a reflux condenser and an agitator, and were heated to 65° C. under a nitrogen atmosphere. 0.1 parts by weight of azobisisobutyronitrile (AIBN) was added, and 0.05 parts by weight of AIBN was further added after 1 hour, followed by polymerization for 6 hours while maintaining the mixture at 65° C. After completing polymerization, the mixture was diluted with 36 parts by weight of ethyl acetate and cooled to room temperature, thereby obtaining a solution of a polymer (A-39). The solution of the polymer (A-39) had a solid content of 35% and a viscosity of 3,500 mPa·s. The polymer (A-39) had a weight average molecular weight of 800,000 g/mol.

Preparation Examples 40 to 57

Solutions of polymers (A-40) to (A-57) were prepared by the same process as in Preparation Example 39 except that the monomers were mixed according to the compositions listed in Table 10 of FIG. 7. Then, the solid contents and the viscosities of the solutions of the polymers (A-40) to (A-57) and the weight average molecular weights of the polymers (A-40) to (A-57) were measured, and results are shown in Table 10. In Table 10, "BA," "2EHA," "VAc," "HEA," "4HBA," "HEAA," "AA," and "AM" refer to butyl acrylate, 2-ethylhexyl acrylate, vinyl acetate, 2-hydroxyethyl acrylate, 4-hydroxybutyl acrylate, N-2-hydroxyethyl acrylamide, acrylic acid, and acylamide, respectively.

Example 21

286 parts by weight of the solution of the polymer (A-39) (100 parts by weight in terms of solid content) obtained in Preparation example 39, 0.2 parts by weight of benzoyl peroxide (B-1, Sigma Aldrich Japan Co., Ltd.) as a peroxide crosslinking agent (B), 0.3 parts by weight of CARBODILITE® V-01 (C-1, Nisshinbo Chemical Inc.) as a carbodiimide crosslinking agent (C), 0.2 parts by weight of Duranate™ 24A-100 (D-2, hexamethylene diisocyanate•biuret, Asahi Kasei Corporation) as an isocyanate crosslinking agent (D), and 0.01 parts by weight of 1-methylimidazole (E-1, Tokyo Kasei Kogyo Co., Ltd.) as an imidazole compound (E) were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 130° C. for 3 minutes, thereby forming an adhesive layer. Then, the adhesive layer was attached to a PET film (Lumirror® S10#25, Thickness: 23 μm, Toray Industries, Inc.), thereby producing an adhesive sheet (1).

Examples 22 to 30 and Comparative Examples 19 to 27

Adhesive composition solutions and adhesive sheets were prepared in the same process as in Example 21 except that the polymers obtained in Preparation Examples 40 to 57, carbodiimide crosslinking agents, imidazole compounds, isocyanate crosslinking agents, and other additives were used according to the compositions listed in Tables 12 and 13 of FIGS. 8 and 9, respectively. Accordingly, adhesive sheets (2) to (10) and comparative adhesive sheets (1) to (9) were obtained. Details of peroxide crosslinking agents B-1 and B-2, carbodiimide cross-linkers C-1, C-2 and C-3, isocyanate crosslinking agents D2 and D3, imidazole compounds E-1, E-2, E-3 and E-4, and other additives H-1, H2, H-3 and H-3 are illustrated in Table 11.

TABLE 11

| | |
|---|---|
| Peroxide crosslinking agent (B) | B-1: benzoyl peroxide (Sigma Aldrich Japan Co., Ltd.)<br>B-2: di(4-t-butylcyclohexyl)peroxide dicarbonate (Sigma Aldrich Japan Co., Ltd.) |
| Carbodiimide crosslinking agent (C) | C-1: CARBODILITE ® V-01 (Nisshinbo Chemical Inc)<br>C-2: CARBODILITE ® V-05 (Nisshinbo Chemical Inc)<br>C-3: CARBODILITE ® V-09 (Nisshinbo Chemical Inc) |
| Isocyanate crosslinking agent (D) | D-2: Hexamethylene diisocyanate•biuret (Duranate ™ 24A-100, Asahi Kasei Corporation)<br>D-3: Hexamethylene diisocyanate•isocyanurate (Duranate ™ TPA-100, Asahi Kasei Corporation) |
| Imidazole compound (E) | E-1: 1-methylimidazole (Tokyo Kasei Kogyo Co., Ltd.)<br>E-2: 1-butylimidazole (Tokyo Kasei Kogyo Co., Ltd.)<br>E-3: 1,2-dimethylimidazole (Tokyo Kasei Kogyo Co., Ltd.)<br>E-4: 2-ethyl-4-methylimidazole (Tokyo Kasei Kogyo Co., Ltd.) |
| Other additives (H) | H-1: Aluminum tris(acetylacetonate) (Alumichelate A, Kawaken Fine Chemicals Co., Ltd.)<br>H-2: Dibutyltin dilaurate (Tokyo Kasei Kogyo Co., Ltd.)<br>H-3: Acetylacetone (Tokyo Kasei Kogyo Co., Ltd.)<br>H-4: N,N,N',N'-tetraglycidyl-m-xylenediamine (TETRAD X, Mitsubishi Gas Chemical Company, Inc.) |

Physical properties of the adhesive sheets obtained according to Examples 21 to 30 and Comparative Examples 19 to 27 were evaluated as follows.

1. Metal Corrosion Control and Prevention Properties

Immediately after preparation of each adhesive layer-attached adhesive sheet (in each example, within 10 minutes after forming an adhesive layer on a PET film by drying (cross-linking) an adhesive composition solution-applied layer at 130° C. for 3 minutes), the adhesive layer of the adhesive sheet was attached to an aluminum foil and left for 2 days under 60° C./90% RH conditions, followed by observation of corrosion. In Tables 12 and 13, no change is indicated by "O" and whitening (indicating corrosion) is indicated by "X."

2. Adhesive Strength

Immediately after preparation of each adhesive layer-attached adhesive sheet ((in each example, within 10 minutes after forming an adhesive layer on a PET film by drying (cross-linking) an adhesive composition solution-applied layer at 130° C. for 3 minutes), the adhesive sheet was cut into a 25 mm wide piece. The piece was pressed to a stainless steel plate, reciprocated once using a 2-kg roller, and left for 20 minutes under at 23° C./50% RH conditions. Then, the adhesive strength was measured according to a test method of pressure sensitive adhesive tapes and sheets disclosed in JIS Z0237 (2000), using a tensile tester at a stripping angle of 180° and a stripping rate of 0.3 m/min under 23° C./50% RH conditions.

3. Adhesion to Substrate

While measuring the adhesive strength, the adhesion to each adhesive sheet (substrate) was evaluated. In Tables 12 and 13, the adhesive layer not being separated from the substrate is indicated by "O," while the adhesive layer being separated from the substrate is indicated by "X."

4. Adherend Contamination Resistance

The contact angle of the stainless steel plate was measured before and after measurement of the adhesive strength. The contact angle was measured according to a test method of wettability of a glass substrate disclosed in JIS R3257 (1999). In Tables 12 and 13, when a change in the contact angle of the stainless steel plate before and after measurement of the adhesive strength was 3° or less, it is indicated by "O," and when a change in the contact angle of the stainless steel plate before and after measurement of the adhesive strength was more than 3°, it is indicated by "X."

5. Low-Temperature Stability

Immediately after preparation of each adhesive layer-attached adhesive sheet (in each example, within 10 minutes after forming an adhesive layer on a PET film by drying (cross-linking) an adhesive composition solution-applied layer at 130° C. for 3 minutes), the adhesive sheet was pressed to a stainless steel plate, reciprocated once using a 2-kg roller, and left for 1 hour under 23° C./50% RH conditions. Then, the stainless steel plate was left at −40° C. for 120 hours, followed by observation of appearance. In Tables 12 and 13, no occurrence of bubbles, separation, or peeling is indicated by "O," while occurrence of bubbles, separation, or peeling is indicated by "X."

6. Transparency of Adhesive Layer

Immediately after preparation of each adhesive layer-attached adhesive sheet (in each example, within 10 minutes after forming an adhesive layer on a PET film by drying (cross-linking) an adhesive composition solution-applied layer at 130° C. for 3 minutes), the adhesive layer of the adhesive sheet was observed with the naked eye to identify transparency of the adhesive sheet. In Tables 12 and 13, proper transparency is indicated by "O" and white turbidity of the adhesive layer is indicated by "X."

7. Heat Resistance

Immediately after preparation of each adhesive layer-attached adhesive sheet (in each example, within 10 minutes after forming an adhesive layer on a PET film by drying (cross-linking) an adhesive composition solution-applied layer at 130° C. for 3 minutes), the adhesive sheet was pressed to a stainless steel plate, reciprocated once using a 2-kg roller, and left for 1 hour under 23° C./50% RH conditions. Then, the stainless steel plate was left at 80° C. for 500 hours, followed by observation of appearance. In Tables 12 and 13, no appearance of bubbles, separation, or peeling is indicated by "O," while appearance of bubbles, separation, or peeling is indicated by "X."

8. Humidity/Heat Resistance

Immediately after preparation of each adhesive layer-attached adhesive sheet (in each example, within 10 minutes after forming an adhesive layer on a PET film by drying (cross-linking) an adhesive composition solution-applied layer at 130° C. for 3 minutes), the adhesive sheet was pressed to a stainless steel plate, reciprocated once using a 2-kg roller, and left for 1 hour under 23° C./50% RH conditions. Then, the stainless steel plate was left for 500 hours under 60° C./90% RH conditions, followed by observation of appearance. In Tables 12 and 13, no appearance of bubbles, separation, or peeling is indicated by "O," and appearance of bubbles, separation, or peeling is indicated by "X."

9. Gel Fraction

Instead of the adhesive layer-attached PET films according to Examples 21 to 30 and Comparative Examples 19 to 27, a solution of each adhesive composition was applied to a stripped polyester film to a dry thickness of 25 μm and subjected to drying (cross-linking) at 130° C. for 3 minutes to form an adhesive layer on the stripped polyester film, followed by measurement of gel fraction within 10 minutes (that is, immediately after preparation of the adhesive layer-attached polyester film) and after storage for 7 days under 23° C./50% RH conditions. That is, about 0.1 g of each adhesive composition, immediately after preparation of the adhesive layer-attached polyester film and left for 7 days under 23° C./50% RH conditions, was weighed and defined as $W_1(g)$. This composition was placed in a sample bottle, and about 30 g of ethyl acetate was added thereto and left for 24 hours. After a predetermined period of time, the contents of the bottle were filtered through a 200-mesh stainless steel mesh (weight: $W_2(g)$). The mesh and the remaining materials were dried at 90° C. for 1 hour, and a total weight $W_3(g)$ was measured. The gel fraction was calculated using the measured values by Equation 2:

$$\text{Gel fraction (\%)} = \{(W_3 - W_2)/W_1\} \times 100. \quad \text{[Equation 2]}$$

Evaluation results are listed in Tables 12 and 13. Further, in Tables 12 and 13, the viscosity of an adhesive composition "immediately after preparation" refers to the viscosity of the adhesive composition measured within 10 minutes after completion of formulation of the adhesive composition (after mixing the respective components for a predetermined period of time). Similarly, in Tables 12 and 13, the gel fraction of an adhesive composition "immediately after preparation" refers to the gel fraction of the adhesive composition measured with respect to a sample immediately (within 10 minutes) after preparation of the adhesive layer-attached polyester film.

As shown in Tables 12 and 13, the adhesive compositions according to Examples 21 to 30 exhibited excellent pot life and allowed the adhesive layers to be cross-linked (cured) in a very short period of time (within 10 minutes) after cross-linking, as compared with the adhesive compositions according to Comparative Examples 19 to 27. Accordingly, the adhesive compositions according to the embodiments may be considered to remarkably help improve workability and productivity. Moreover, the adhesive sheets according to Examples 21 to 30 exhibited excellent adhesion to substrate, adherend contamination resistance, low-temperature stability, transparency of the adhesive layers, heat resistance, and humidity/heat resistance, as compared with the adhesive sheets of Comparative Examples 19 to 27.

By way of summation and review, an adhesive composition for optical members, which includes an acrylic polymer, peroxides, and a silane coupling agent has been considered. Such an adhesive composition may exhibit excellent durability under high-temperature and high-humidity conditions, and may not require aging after deposition, drying, and cross-linking. However, although such an adhesive composition may reduce an aging period, as compared with other adhesive compositions, it may still require an aging time of at least 0.5 days.

The embodiments provide an adhesive composition capable of further reducing an aging time in consideration of productivity.

The embodiments provide an adhesive composition having a long pot life to obtain excellent workability and exhibiting practical adhesive performance within a short aging time of 10 minutes after or immediately after adhesive processing, thereby providing excellent productivity.

The adhesive composition may be effective in bonding various adherends, and an adhesive layer formed of the adhesive composition may be suitably used as an adhesive layer for optical members, surface protective films, and adhesive sheets.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive composition, comprising:
   100 parts by weight of a (meth)acrylic copolymer having a weight average molecular weight of about 100,000 to about 2,000,000 g/mol;
   about 0.01 to about 5 parts by weight of a peroxide crosslinking agent; and
   about 0.001 to about 5 parts by weight of a carbodiimide,
   further comprising at least one of an isocyanate crosslinking agent and an imidazole compound, the imidazole compound being represented by Formula 1:

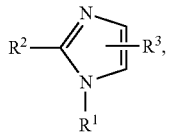

[Formula 1]

wherein, in Formula 1, $R^1$, $R^2$, and $R^3$ are each independently a hydrogen atom, a halogen atom, or a substituted or unsubstituted $C_1$ to $C_{10}$ straight or branched alkyl group, and wherein:
   an adhesive layer formed from the adhesive composition has a gel fraction of at least about 50% under conditions of 23° C and 50% RH within a time period of about 12 hours or less after forming the adhesive composition into the adhesive layer.

2. The adhesive composition as claimed in claim 1, wherein the (meth)acrylic copolymer is prepared from a monomer mixture including:
   about 0 to about 9 parts by weight of a carboxyl group containing monomer,
   about 0 to about 9 parts by weight of a hydroxyl group containing (meth)acrylic monomer, and
   about 82 to about 99.9 parts by weight of a (meth)acrylic acid ester monomer, a total amount of the carboxyl group containing monomer and the hydroxyl group containing (meth)acrylic monomer being greater than 0 parts by weight and a total amount of the carboxyl group containing monomer, the hydroxyl group containing (meth)acrylic monomer, and the (meth)acrylic acid ester monomer being 100 parts by weight.

3. The adhesive composition as claimed in claim 1, wherein the composition includes the isocyanate crosslinking agent, the isocyanate crosslinking agent being present in an amount of about 0.05 to about 5 parts by weight, based on 100 parts by weight of the (meth)acrylic copolymer.

4. The adhesive composition as claimed in claim 1, wherein the composition includes the imidazole compound, the imidazole compound being present in an amount of about 0.05 to about 5 parts by weight, based on 100 parts by weight of the (meth)acrylic copolymer.

5. The adhesive composition as claimed in claim 1, further comprising a silane coupling agent.

6. An optical member comprising an adhesive layer prepared from the adhesive composition as claimed in claim 1.

7. The optical member as claimed in claim 6, wherein:
   the (meth)acrylic copolymer has a weight average molecular weight of about 1,000,000 to about 1,800,000 g/mol, and
   the adhesive layer has an adhesive strength of about 0.5 to about 9 N/25 mm according to JIS Z0237.

8. The optical member as claimed in claim 6, wherein the adhesive layer has a gel fraction of about 50 to about 95% under conditions of about 23° C and about 50%RH after forming the adhesive composition into the adhesive layer.

9. A surface protective film comprising an adhesive layer prepared from the adhesive composition as claimed in claim 1.

10. The surface protective film as claimed in claim 9, wherein:
    the (meth)acrylic copolymer has a weight average molecular weight of about 150,000 to about 900,000 g/mol, and
    the adhesive layer has an adhesive strength of about 0.05 to about 0.3 N/25mm according to JIS Z0237.

11. The surface protective film as claimed in claim 9, wherein the adhesive layer has a gel fraction of about 70 to about 100% under conditions of about 23° C. and about 50% RH after forming the adhesive composition into the adhesive layer.

12. An adhesive sheet comprising an adhesive layer prepared from the adhesive composition as claimed in claim 1.

13. The adhesive sheet as claimed in claim 12, wherein:
    the (meth)acrylic copolymer has a weight average molecular weight of about 150,000 to about 950,000 g/mol, and
    the adhesive layer has an adhesive strength of about 0.05 to about 20 N/25 mm according to JIS Z0237.

14. The adhesive sheet as claimed in claim 12, wherein the adhesive layer has a gel fraction of about 70 to about 100% under conditions of about 23° C. and about 50% RH after forming the adhesive composition into the adhesive layer.

15. The adhesive composition as claimed in claim 1, wherein the adhesive layer has an adhesive strength of about 0.05 to about 0.3 N/25 mm according to JIS Z0237.

16. The adhesive composition as claimed in claim 1, wherein the adhesive layer has an adhesive strength of about 0.5 to about 9 N/25 mm according to JIS Z0237.

17. The adhesive composition as claimed in claim 15, wherein the gel fraction of the adhesive layer is about 70 to about 100% under conditions of 23° C. and 50% RH within the time period of about 12 hours or less after forming the adhesive composition into the adhesive layer.

18. The adhesive composition as claimed in claim 16, wherein the gel fraction of the adhesive layer is about 50 to about 95% under conditions of 23° C. and 50% RH within the time period of about 12 hours or less after forming the adhesive composition into the adhesive layer.

19. An adhesive composition, comprising:
    100 parts by weight of a (meth)acrylic copolymer having a weight average molecular weight of about 100,000 to about 2,000,000 g/mol;
    about 0.01 to about 5 parts by weight of a peroxide crosslinking agent; and
    about 0.001 to about 5 parts by weight of a carbodiimide,
    further comprising at least one of about 0.05 to about 5 parts by weight of an isocyanate crosslinking agent and about 0.05 to about 5 parts by weight of an imidazole compound, the imidazole compound being represented by Formula 1:

[Formula 1]
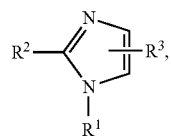
wherein, in Formula 1, $R^1$, $R^2$, and $R^3$ are each independently a hydrogen atom, a halogen atom, or a substituted or unsubstituted $C_1$ to $C_{10}$ straight or branched alkyl group.
* * * * *